United States Patent
Norieda

(10) Patent No.: US 9,727,140 B2
(45) Date of Patent: Aug. 8, 2017

(54) TACTILE FORCE SENSE PRESENTATION DEVICE, INFORMATION TERMINAL, TACTILE FORCE SENSE PRESENTATION METHOD, AND COMPUTER-READABLE RECORDING MEDIUM

(71) Applicant: NEC Corporation, Minato-ku, Tokyo (JP)

(72) Inventor: Shin Norieda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 122 days.

(21) Appl. No.: 14/419,686

(22) PCT Filed: Aug. 23, 2013

(86) PCT No.: PCT/JP2013/072527
§ 371 (c)(1),
(2) Date: Feb. 5, 2015

(87) PCT Pub. No.: WO2014/034550
PCT Pub. Date: Mar. 6, 2014

(65) Prior Publication Data
US 2015/0227200 A1 Aug. 13, 2015

(30) Foreign Application Priority Data

Aug. 31, 2012 (JP) .................. 2012-192507

(51) Int. Cl.
*G06F 3/041* (2006.01)
*G06F 3/045* (2006.01)
(Continued)

(52) U.S. Cl.
CPC ............ *G06F 3/016* (2013.01); *G06F 1/1626* (2013.01); *G06F 3/041* (2013.01); *G06F 3/0412* (2013.01); *G06F 3/0414* (2013.01); *G06F 3/0416* (2013.01)

(58) Field of Classification Search
CPC ...... G06F 3/016; G06F 3/0414; G06F 3/0416; G06F 3/0412; G06F 1/1626; G06F 3/041
(Continued)

(56) References Cited

U.S. PATENT DOCUMENTS

2008/0238635 A1* 10/2008 Klinghult ................. G05G 5/05
340/407.1
2009/0102805 A1* 4/2009 Meijer ..................... G06F 3/016
345/173
(Continued)

FOREIGN PATENT DOCUMENTS

JP 2002149312 A 5/2002
JP 4039344 B 4/2005
(Continued)

OTHER PUBLICATIONS

International Search Report for PCT Application No. PCT/JP2013/072527, mailed on Nov 26, 2013.
(Continued)

*Primary Examiner* — Amit Chatly

(57) ABSTRACT

In order to present a tactile force sense to a user who performs an input operation on a screen of a display panel (20), a tactile force sense presentation device (10) includes a tactile force sense presentation member (11) that transmits a tactile force sense to the user, an actuator (12) that moves the tactile force sense presentation member (11), a vibration generation unit (13) that generates a vibration on the tactile force sense presentation member (11), and a control unit (14). If content on the screen is changed in accordance with the input operation of the user on the screen, the control unit (14) gives the actuator (12) an instruction to move the tactile force sense presentation member (11) such that the tactile force sense corresponding to the change of the content is presented, and gives the vibration generation unit (13) an instruction to generate a vibration such that a vibration is (Continued)

generated on the tactile force sense presentation member (11) simultaneously with start of the movement of the tactile force sense presentation member (11), or before start of the movement.

6 Claims, 16 Drawing Sheets

(51) Int. Cl.
 *G06F 3/01* (2006.01)
 *G06F 1/16* (2006.01)
(58) Field of Classification Search
 USPC .................................................. 345/173–178
 See application file for complete search history.

(56) References Cited

U.S. PATENT DOCUMENTS

| | | | | |
|---|---|---|---|---|
| 2011/0134061 | A1* | 6/2011 | Lim | G06F 3/016 345/173 |
| 2012/0038568 | A1* | 2/2012 | Colloms | G06F 3/016 345/173 |

FOREIGN PATENT DOCUMENTS

| | | |
|---|---|---|
| JP | 2006215738 A | 8/2006 |
| JP | 2009116863 A | 5/2009 |
| JP | 2010-522389 A | 7/2010 |
| JP | 2011501298 A | 1/2011 |
| JP | 2011-123888 A | 6/2011 |
| JP | 2012518218 A | 8/2012 |
| WO | 2012023606 A1 | 2/2012 |

OTHER PUBLICATIONS

Japanese Office Action for JP Application No. 2014-532974 mailed on Mar. 14, 2017 with English Translation.

\* cited by examiner $T_F$: Delay time period in tactile force sense presentation
(= Vibration duration)

$T_F$:Delay time period in tactile force sense presentation

TACTILE FORCE SENSE PRESENTATION DEVICE, INFORMATION TERMINAL, TACTILE FORCE SENSE PRESENTATION METHOD, AND COMPUTER-READABLE RECORDING MEDIUM

The present application is a National Stage Entry of PCT/JP2013/072527 filed Aug. 23, 2013, which is based on and claims the benefit of the priority of Japanese Patent Application No. 2012-192507, filed on Aug. 31, 2012, the disclosures of all of which are incorporated herein in their entirety by reference.

TECHNICAL FIELD

The present invention relates to a tactile force sense presentation device that presents (transmits) a tactile force sense to a user, an information terminal, such as a POS terminal or a mobile terminal (smartphone, tablet, etc.), equipped with the tactile force sense presentation device, a tactile force sense presentation method, and a computer-readable recording medium storing a program for realizing them.

BACKGROUND ART

In recent years, more and more information terminals employ a touch panel as an input device. Since a touch panel can be arranged so as to be overlaid on a display panel, it has been the mainstream of input devices particularly in mobile information terminals, for the reason that the screen can be expanded therewith.

Meanwhile, a touch panel can give feedback on a user operation and present information in accordance with an operation, only by presenting some kind of information on the screen. For this reason, the user cannot obtain information other than the displayed information, and it is difficult for the user to recognize which part of the screen he/she is touching. Accordingly, the touch panel has a problem in that it is difficult for the user to perform an operation.

To address this problem, a device has been proposed that enables physical feedback to be provided to a fingertip of a user, that is, a device that enables a tactile force sense to be presented (transmitted) (e.g., see Patent Documents 1 and 2). Specifically, the device disclosed in Patent Document 1 includes a mechanism that enables a display panel provided on a screen of a touch panel to be moved along a thickness direction of the display panel. With the device disclosed in Patent Document 1, the aforementioned mechanism can move the display panel in accordance with a finger touch by a user, and accordingly a tactile force sense can be presented to the user.

Patent Document 2 proposes a device that presents a tactile sense to a fingertip of a user by vibrating a touch panel, using a piezoelectric actuator (e.g., see Patent Document 2). The device disclosed in Patent Document 2 is configured by overlaying a transparent panel, in which the piezoelectric actuator is embedded, on the touch panel and a display panel.

However, with the device disclosed in Patent Document 1, since the entire touch panel needs to be operated, the structure becomes complicated and the size and weight of the device itself consequently increases. For this reason, it is difficult to mount the device disclosed in Patent Document 1 in a mobile terminal such as a smartphone or a tablet.

On the other hand, it is considered that the device disclosed in Patent Document 2 will be able to be mounted in a mobile terminal, since an increase in the size and weight of the device is avoided, unlike the device disclosed in Patent Document 1. However, with the device disclosed in Patent Document 2, the range of displacement is small, only tactile sense presentation using a vibration can be performed, and furthermore, expressiveness of tactile force presentation using a vibration is poor. Therefore, the device disclosed in Patent Document 2 is not suitable for content that requires successive changes and accuracy.

Incidentally, it is considered that the problem in Patent Document 2 can be solved with the device disclosed in Patent Document 1. Accordingly, for example, if the size of the actuator used for moving the touch panel and the display panel can be reduced in the device disclosed in Patent Document 1, both of the aforementioned two problems can be solved at a time, and it is considered that the device can be mounted in a mobile terminal.

CITATION LIST

Patent Document

Patent Document 1: Japanese Patent No. 4039344
Patent Document 2: JP2006-215738 A

DISCLOSURE OF THE INVENTION

Problem to be Solved by the Invention

However, if the size of the actuator is reduced, the presentation force of the actuator and the speed of displacement of the touch panel and the like significantly decrease, and it is difficult to present a sufficient force sense for giving necessary physical feedback to the user.

Furthermore, in general, in an actuator, the presentation force and the displacement speed are in a trade-off relationship. For this reason, if it is attempted to increase the presentation force using a small actuator, the displacement speed excessively decreases, and it takes more time for the user to notice that a tactile force sense is presented. Consequently, the user will sensitively feel a time delay in the response of tactile force sense presentation.

An exemplary object of the present invention is to solve the aforementioned problems and provide a tactile force sense presentation device that can make it difficult for a user to feel a time delay in tactile force sense presentation, without being affected by performance of an actuator, an information terminal, a tactile force sense presentation method, and a computer-readable recording medium.

Means for Solving the Problem

To achieve the foregoing object, a tactile force sense presentation device according to one aspect of the present invention is a tactile force sense presentation device for presenting a tactile force sense to a user who performs an input operation on a screen of a display panel, the tactile force sense presentation device including: a tactile force sense presentation member for transmitting a tactile force sense to the user; an actuator that moves the tactile force sense presentation member in order to present the tactile force sense; a vibration generation unit that generates a vibration on the tactile force sense presentation member; and a control unit that controls the actuator and the vibration generation unit, wherein, when content on the screen of the display panel is changed in accordance with the input operation of the user on the screen, the control unit gives the actuator an instruction to move the tactile force sense presentation member such that the tactile force sense corresponding to the change of the content is presented, and gives the vibration generation unit an instruction to generate a vibration such that a vibration is generated on the tactile force sense presentation member simultaneously with start of the movement of the tactile force sense presentation member, or before the start of the movement.

To achieve the foregoing object, an information terminal according to one aspect of the present invention is an information terminal including: a display panel that displays content on a screen; a touch sensor that detects a position touched by a user on the screen; an information processing unit that accepts an input operation in accordance with the position detected by the touch sensor, and changes the content in accordance with the accepted input operation; and a tactile force sense presentation device capable of presenting a tactile force sense to the user, the tactile force sense presentation device including: a tactile force sense presentation member for transmitting a tactile force sense to the user; an actuator that moves the tactile force sense presentation member in order to present the tactile force sense; a vibration generation unit that generates a vibration on the tactile force sense presentation member; and a control unit that controls the actuator and the vibration generation unit, wherein, when the content on the screen of the display panel is changed by the information processing unit in accordance with the input operation of the user on the screen, the control unit gives the actuator an instruction to move the tactile force sense presentation member such that the tactile force sense corresponding to the change of the content is presented, and gives the vibration generation unit an instruction to generate a vibration such that a vibration is generated on the tactile force sense presentation member simultaneously with start of the movement of the tactile force sense presentation member, or before the start of the movement.

To achieve the foregoing object, a tactile force sense presentation method according to one aspect of the present invention is a method for presenting a tactile force sense to a user who performs an input operation on a screen of a display panel, using a device including a tactile force sense presentation member for transmitting a tactile force sense to the user, an actuator that moves the tactile force sense presentation member in order to present the tactile force sense, and a vibration generation unit that generates a vibration on the tactile force sense presentation member, the method including: a step (a) of giving, when content on the screen of the display panel is changed in accordance with an input operation of the user on the screen, the actuator an instruction to move the tactile force sense presentation member such that the tactile force sense corresponding to the change of the content is presented; and a step (b) of giving the vibration generation unit an instruction to generate a vibration such that a vibration is generated on the tactile force sense presentation member simultaneously with start of the movement of the tactile force sense presentation member, or before the start of the movement.

Furthermore, to achieve the foregoing object, a computer-readable recording medium according to one aspect of the present invention is a computer-readable recording medium storing a program for a device including a tactile force sense presentation member for transmitting a tactile force sense to a user who performs an input operation on a screen of a display panel, an actuator that moves the tactile force sense presentation member in order to present the tactile force sense, a vibration generation unit that generates a vibration on the tactile force sense presentation member, and a computer, the program including a command for causing the computer to execute: a step (a) of giving, when content on the screen of the display panel is changed in accordance with an input operation of the user on the screen, the actuator an instruction to move the tactile force sense presentation member such that the tactile force sense corresponding to the change of the content is presented; and a step (b) of giving the vibration generation unit an instruction to generate a vibration such that a vibration is generated on the tactile force sense presentation member simultaneously with start of the movement of the tactile force sense presentation member, or before the start of the movement.

Effects of the Invention

As described above, according to the present invention, it is possible to make it difficult for a user to feel a time delay in tactile force sense presentation, without being affected by performance of an actuator.

BRIEF DESCRIPTION OF THE DRAWINGS

FIG. 11A is a plan view, and FIG. 11B is a side view.

FIG. 12 shows an information terminal in an example.

DESCRIPTION OF EMBODIMENTS

Embodiment 1

Hereinafter, a tactile force sense presentation device, an information terminal, a tactile force sense presentation method, and a program according to Embodiment 1 of the present invention will be described with reference to FIGS. 1 to 3.

[Device Configuration]

First, a configuration of a tactile force sense presentation device and an information terminal according to Embodiment 1 will be described using FIGS. 1 and 2. FIG. 1 is a perspective view showing an external appearance of an information terminal according to Embodiment 1 of the present invention. FIG. 2 is an exploded perspective view showing constituent components of the information terminal according to Embodiment 1 of the present invention.

Figure 1:
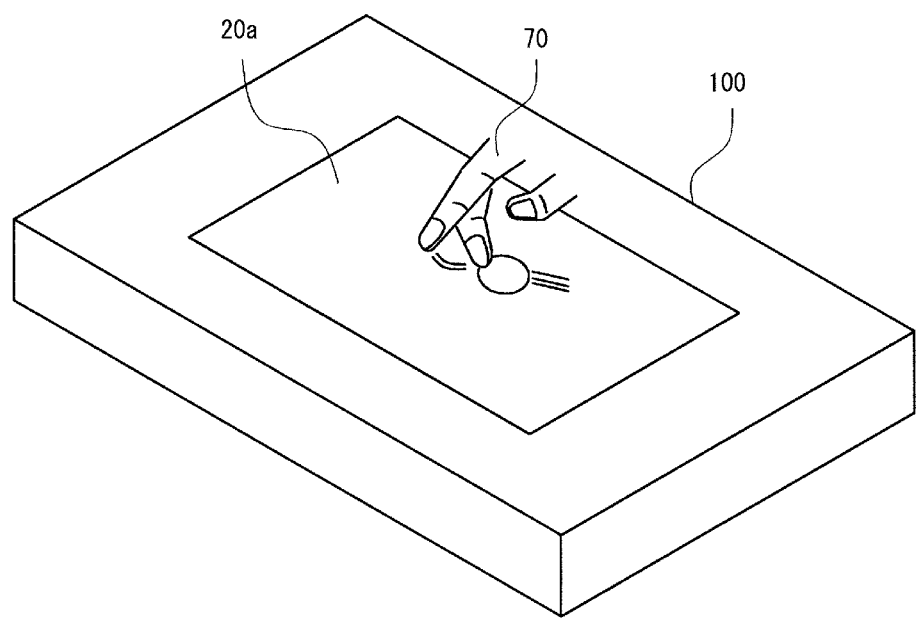
FIG. 1 is a perspective view showing an external appearance of an information terminal according to Embodiment 1 of the present invention.

As shown in FIG. 1, an information terminal 100 according to Embodiment 1 is a tablet-type information terminal. As shown in FIG. 2, the information terminal 100 is provided with a display panel 20 that displays content, a touch sensor 30 that detects a position (hereinafter referred to as a "touch position") touched by a user, and an information processing unit 40 that executes various kinds of information processing.

With this configuration, as shown in FIG. 1, upon a user 70 performing an input operation on the information terminal 100 by touching, in the information terminal 100 the touch position is detected by the touch sensor 30, and the information processing unit 40 is notified of the detected position. The information processing unit 40 accepts the input operation of the user in accordance with the touch position, executes processing for changing content in accordance with the accepted input operation, and displays various kinds of content on a screen 20a of the display panel 20.

Figure 2:
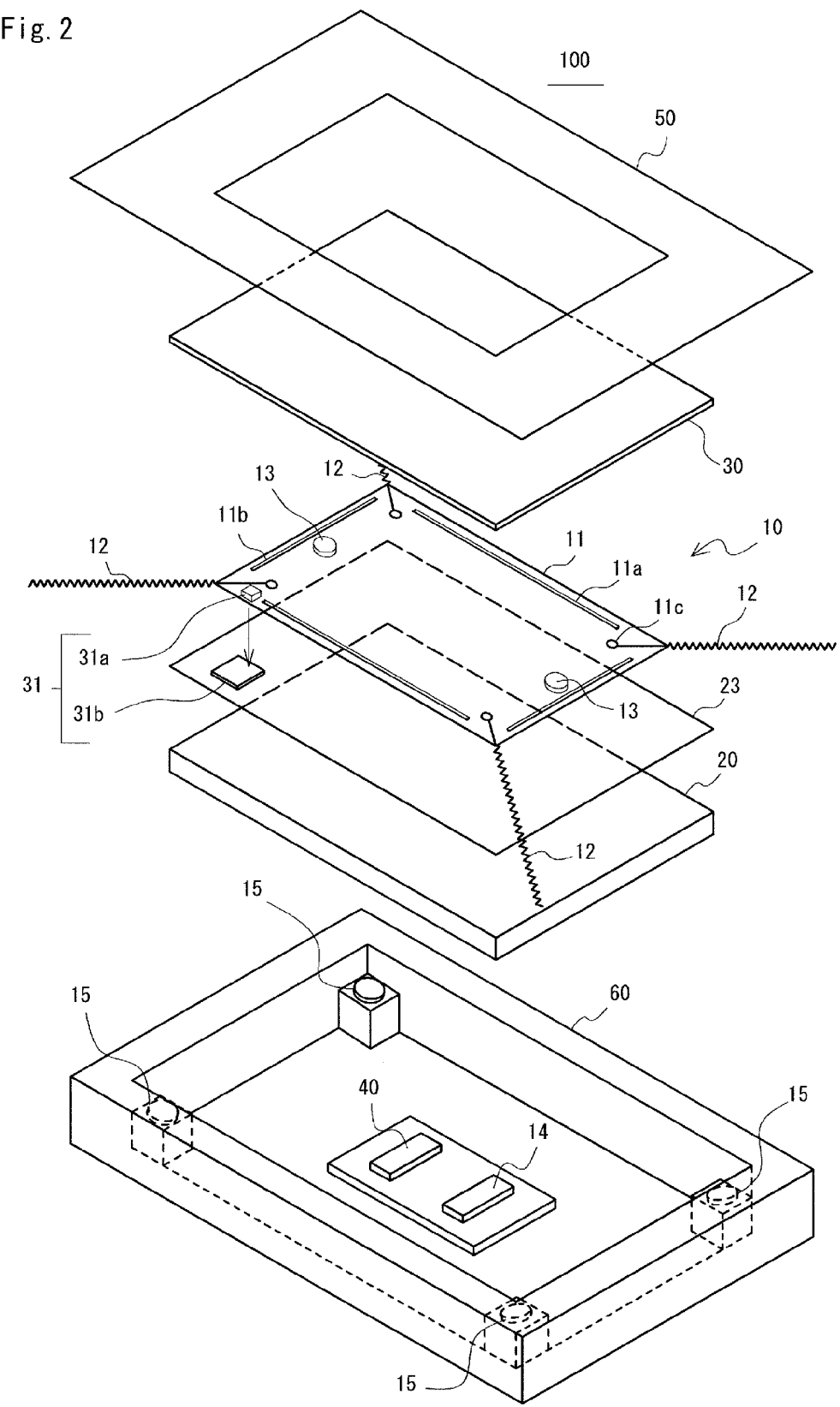
FIG. 2 is an exploded perspective view showing constituent components of the information terminal according to Embodiment 1 of the present invention.

As shown in FIG. 2, the information terminal 100 is provided with a tactile force sense presentation device 10 that presents a tactile force sense to the user who performs an input operation on the screen 20a of the display panel 20. The tactile force sense presentation device 10 is provided with a tactile force sense presentation member 11 for transmitting a tactile force sense to the user, actuators 12 that move the tactile force sense presentation member 11 in order to present a tactile force sense, a vibration generation unit 13 that generates a vibration on the tactile force sense presentation member 11, and a control unit 14 that controls the actuators 12 and the vibration generation unit 13.

If the content on the screen 20a of the display panel 20 changes in accordance with the input operation of the user on the screen 20a, the control unit 14 gives the actuators 12 an instruction to move the tactile force sense presentation member 11 such that a tactile force sense corresponding to the change of the content is presented. Furthermore, in this case, the control unit 14 gives the vibration generation unit 13 an instruction to generate a vibration such that a vibration is generated on the tactile force sense presentation member 11 simultaneously with start of the movement of the tactile force sense presentation member, or before the start of the movement.

Thus, the tactile force sense presentation device 10 can present, to the user, not only a tactile force sense caused by a movement of the tactile force sense presentation member 11 but also a vibration at a higher transmission speed than that of the tactile force sense, and can restrain the user from feeling that tactile force sense presentation is slow when the displacement speed of the actuators is low. That is to say, with the tactile force sense presentation device 10, it is possible to make it difficult for a user to feel a time delay in tactile force sense presentation, without being affected by performance of the actuators. Furthermore, with this configuration, a small actuator with a low displacement speed can be used, and it is accordingly possible to achieve a reduction in the size, thickness, and weight of the information terminal 100.

In the example in FIG. 1, a finger of the user 70 is touching a virtual ball displayed on the display panel 20. Thus, the user 70 feels a vibration at the fingertip, and further feels a repulsive force and a touch from the virtual ball given by the tactile force sense presentation member 11, in accordance with the positional relationship between the virtual ball and the finger, and an operation state (speed, weight) of the virtual ball. Note that the "tactile force sense" in the present invention means a repulsive force, a resistance force, an external force, a touch, and the like that the user feels.

The configuration of the information terminal 100 and the tactile force sense presentation device 10 according to Embodiment 1 will now be described in more detail. As shown in FIG. 2, the information terminal 100 is constituted by roughly five layers. The following description is given, assuming that the layer that is closest to the user is a first layer.

First, in the first layer, a cover 50 is arranged that hides the inside of the information terminal 100 and the edge of the tactile force sense presentation member 11 such that they cannot be seen from the outside. The cover 50 is formed in a frame shape such that the user can touch a detection area of the touch sensor 30 provided in a lower layer, and the width of the cover 50 is set such that the user cannot touch the outside of the detection area.

In a second layer, the touch sensor 30 is arranged. In the present embodiment, a touch panel is used as the touch sensor 30. The touch panel is located on the front face side of the tactile force sense presentation member 11, and is integrated with the tactile force sense presentation member 11. With this configuration, upon the user touching the touch panel, the touch panel detects the touched position, and outputs data (hereinafter referred to as "touch detection data") that specifies it. Furthermore, the touch panel is moved with the tactile force sense presentation member 11 by the actuators 12.

In a third layer, the tactile force sense presentation member 11, the actuators 12 for moving it, and the vibration generation unit 13 are arranged. The actuators 12 are four wire-shaped actuators in the present embodiment, and each of the actuators 12 is attached, at its one end, to the tactile force sense presentation member 11 such that the tactile force sense presentation member 11 moves along the front face of the display panel 20. Specifically, one end of each wire-shaped actuator 12 is connected to a through hole formed near a corresponding corner of the tactile force sense presentation member 11, the other end is connected to a later-described casing 51, and the tactile force sense presentation member 11 is moved by tensile forces of the actuators 12 (see FIG. 3).

In the present embodiment, the tactile force sense presentation member 11 is made of optically transparent acrylic resin or the like in a panel shape, and is arranged on the front face side of the display panel 20. Furthermore, in a face (back face) of the tactile force sense presentation member 11 on the display panel 20 side, projecting portions 11a and 11b having a semicircular cross-section are formed so as to extend along respective sides. The projecting portions 11a and 11b prevent the surface of a later-described support panel 23 from being damaged due to the movement of the tactile force sense presentation member 11.

The vibration generation unit 13 is arranged in the back face of the tactile force sense presentation member 11. In Embodiment 1, examples of the vibration generation unit 13 include a piezoelectric device, a vibration generation device constituted by a semicircular vibrator and a small motor, and the like. Note that the vibration generation unit 13 need only be attached so as to be able to generate a vibration on the tactile force sense presentation member, and may be arranged in the surface of the tactile force sense presentation member 11.

In a fourth layer, the support panel 23 and the display panel 20 are arranged. In Embodiment 1, a liquid crystal display panel is used as the display panel 20. However, the display panel 20 is not limited thereto, and the display format is not particularly limited as long as the display panel 20 is a thin display panel.

The support panel 23 is a rectangular plate made of transparent resin such as acrylic resin, and is formed so as to cover the display panel 20. The support panel 23 is arranged between the tactile force sense presentation member 11 and the display panel 20, supports the tactile force sense presentation member 11, and protects the display panel 20.

A light source 31a that radiates spot light is arranged in the tactile force sense presentation member 11 in the third layer, and a light-receiving device 31b that receives the spot light radiated from the light source 31a and outputs a signal corresponding to a light-receiving position is arranged in the support panel 23 in the fourth layer. Since the light source 31b moves together with the tactile force sense presentation member 11, the position of the tactile force sense presentation member 11 is detected by the light source 31a and the light-receiving device 31b. The light source 31a and the light-receiving device 31b function as a position detection sensor 31 of the tactile force sense presentation member 11. Note that the light source 31a may be arranged in either of the surface and the back face of the tactile force sense presentation member 11. Similarly, the light-receiving device 31b may also be arranged in either of the surface and the back face (face on the display panel side) of the support panel 23.

In a fifth layer, the control unit 14 and the information processing unit 40 are arranged. These control unit 14 and information processing unit 40 are realized by computers such as microcomputers. They may be realized by different computers, or may be realized by the same computer. All constituent components in the first to fifth layers are housed within the casing 51.

Subsequently, a mechanism for moving the tactile force sense presentation device 10 using the actuators 12 will be described using FIG. 3. FIG. 3 is a diagram specifically showing a configuration of the actuators that constitute the tactile force sense presentation device shown in FIG. 2.

Figure 3:
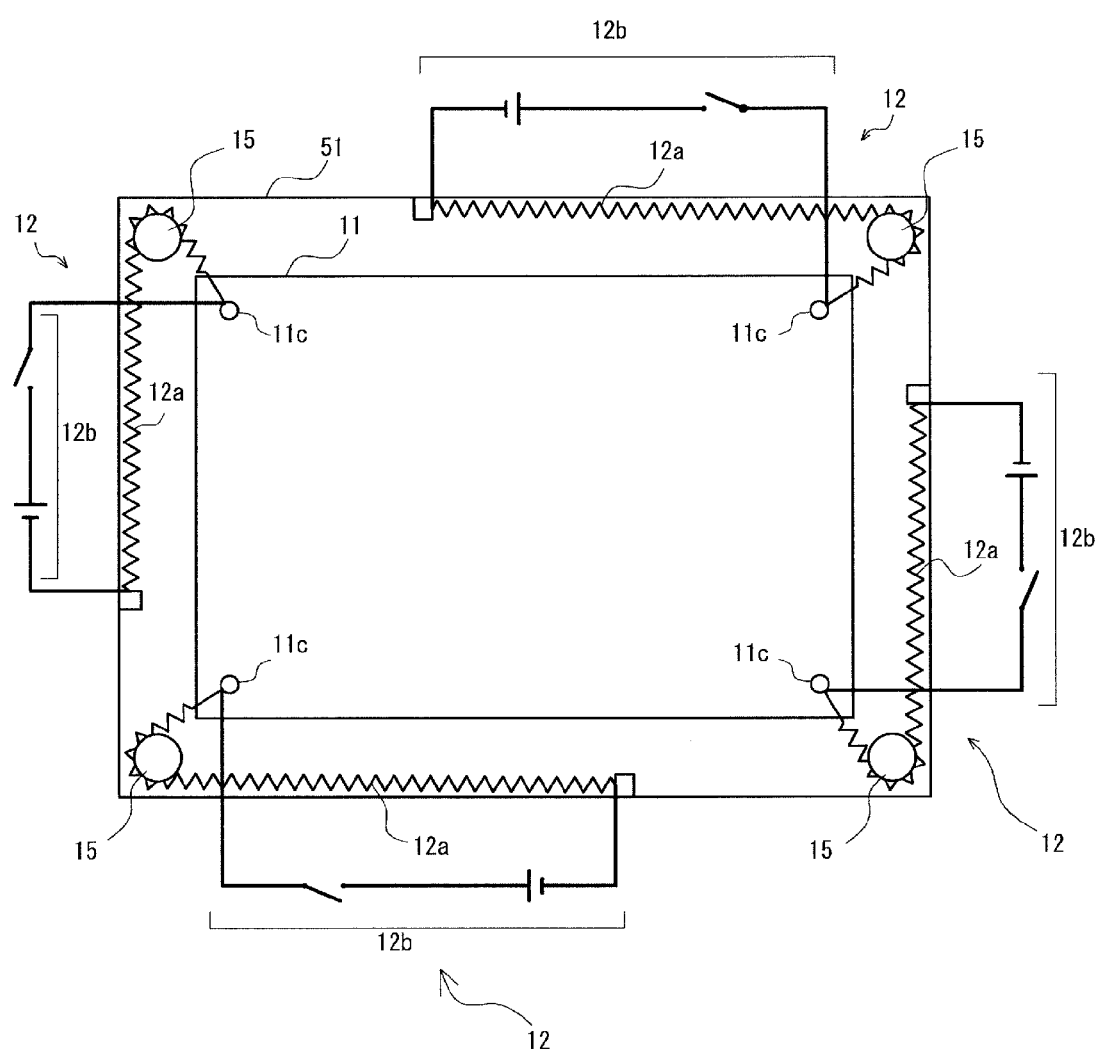
FIG. 3 is a diagram specifically showing a configuration of actuators that constitute a tactile force sense presentation device shown in FIG. 2.

As shown in FIG. 3, in Embodiment 1, the wire-shaped actuators 12 are each provided with a wire 12a made of shape memory alloy and an electric heating device 12b that heats the wire 12a by supplying electricity thereto and thus restores the wire 12a to its original shape. One end of each wire 12a is connected to a hole 11c provided near a corresponding corner of the tactile force sense presentation member 11, and the other end is connected to the later-described casing 51.

In this configuration, upon the control unit 14 (see FIG. 2) controlling the amount of electricity supplied by the electric heating devices 12b, tensile forces are generated due to restoration of the wires 12a to their original shape. The tactile force sense presentation member 11 then moves along the front face of the display panel 20 in accordance with a power relationship of the tensile forces.

By using the wires 12a made of shape memory alloy as the actuators 12, the size of the actuators 12 can be reduced, which contributes to a reduction in the size, thickness, and weight of the information terminal 100. Furthermore, the wires 12a made of shape memory alloy have an advantage of large tensile forces, as well as an advantage of being able to increase the amount of displacement by being set in a greatly expanded state.

However, since the wires 12a made of shape memory alloy perform operation by being heated through electricity supply, there is a disadvantage of slow reaction, particularly when they are cool, as well as a disadvantage of a low displacement speed. However, a vibration is also presented in Embodiment 1, as mentioned above. For this reason, a situation will be avoided where, due to these disadvantages, the user feels that tactile force sense presentation is slow.

Furthermore, in Embodiment 1, in order to increase flexibility of the layout of the wires 12a while increasing the amount of displacement of the wires 12a as much as possible, pulleys 15 are provided at four corners of the inside of the casing 51. Each wire 12a is arranged in a state where the direction of its tensile force is converted by the corresponding pulley 15.

Figure 4:
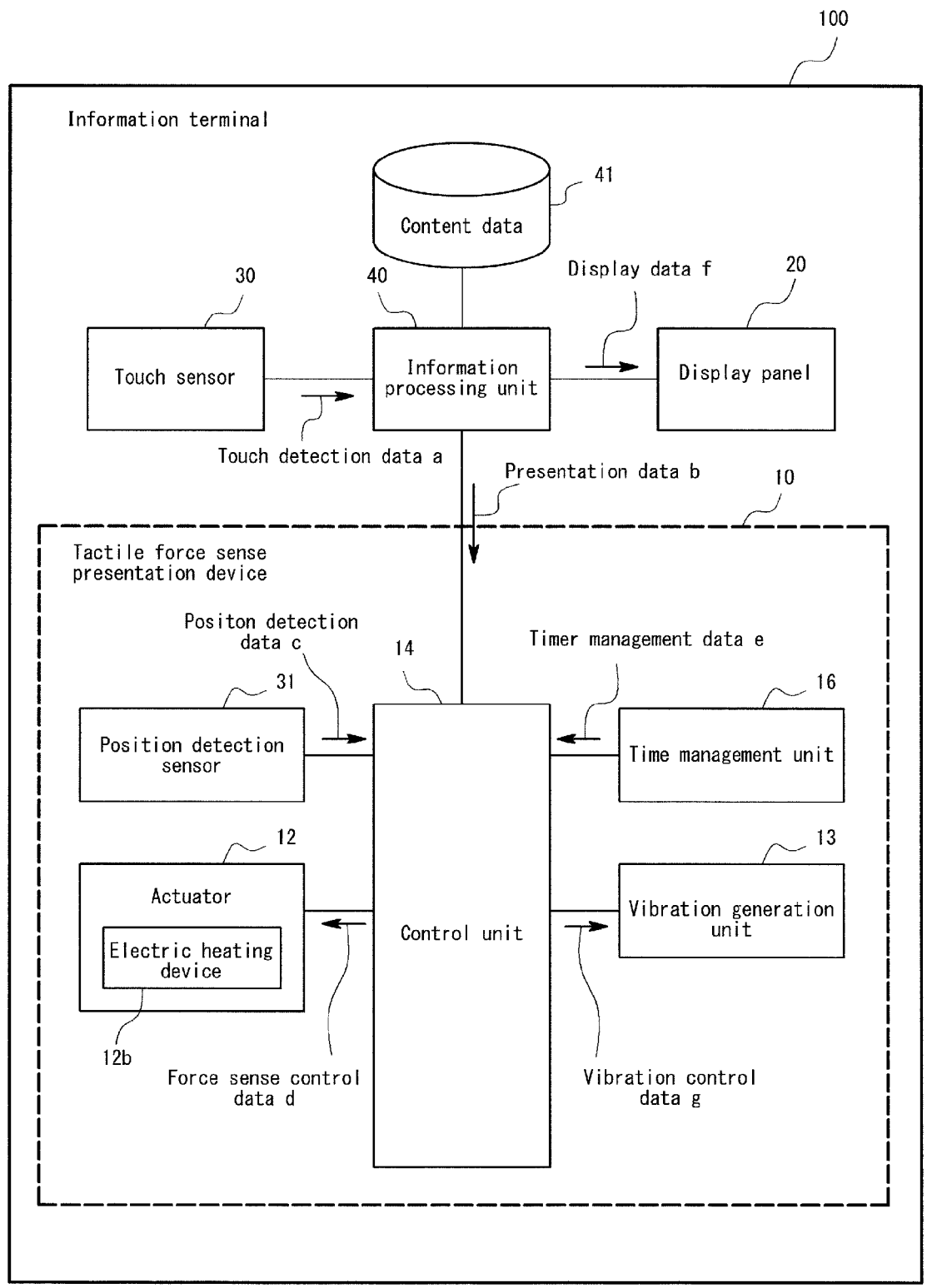
FIG. 4 is a block diagram showing a configuration of the information terminal according to Embodiment 1 of the present invention.

Subsequently, data exchanged in the information terminal 100 will be described using FIG. 4. FIG. 4 is a block diagram showing a configuration of the information terminal according to Embodiment 1 of the present invention.

As shown in FIG. 4, the information processing unit 40 is connected to the display panel 20, the touch sensor 30, and the control unit 14. The control unit 14 is connected to the information processing unit 40, and also to the electric heating device 12b constituting each actuator 12, the vibration generation unit 13, the position detection sensor 31, and a time management unit 16.

In the information terminal 100 having this configuration, upon the user 70 (see FIG. 1) touching the touch sensor (touch panel) 30 arranged on the front face side of the display panel 20, the touch sensor 30 detects the position (touch position) of the finger of the user, and outputs touch detection data a that specifies the touch position to the information processing unit 40.

The information processing unit 40, upon receiving the touch detection data a, references content data 41, performs processing for associating the touch position with a movement of an object in the content, generates content display information that reflects the processing content, and outputs this display information as display data f to the display panel 20. The display panel 20, upon receiving the display data f, displays an image corresponding to the received display data f on the display screen 20a (see FIG. 1).

Specific examples of the content data 41 include data of application programs for providing a virtual space, such as a game program and a simulation program, and also include Web site data. The content data 41 may be stored in a storage device provided in the information terminal 100, and may be stored in a separate device (computer) connected via the Internet.

At this time, the information processing unit 40 calculates a force generated on the object in the virtual space, and outputs data b (hereinafter referred to as "presentation data b") for specifying the calculated force to the control unit 14. The calculated force is a repulsive force or the like that is generated on the object, and corresponds to the tactile force sense to be transmitted to the user.

The control unit 14 receives the presentation data b and data c that is output from the position detection sensor 31. The data c that is output from the position detection sensor 31 is data (hereinafter referred to as "position detection data") c that specifies the position of the tactile force sense presentation member 11.

The control unit 14 calculates, using the presentation data b and the position detection data c, a tensile force to be output by each actuator 12 (wire 12*a*). This calculation is performed such that the tactile force sense specified by the presentation data b is transmitted to the user 70 when the tactile force sense presentation member 11 moves along a horizontal plane.

The control unit 14 then generates force sense control data d that causes each actuator 12 to exert a tensile force, and outputs it to the corresponding electric heating device 12*b*. Specifically, the control unit 14 generates a signal for driving each electric heating device 12*b*, and outputs it as the force sense control data d. Thus, each electric heating device 12*b* supplies electricity to the corresponding wire 12*a*, and the wire 12*a* exerts the calculated tensile force. Accordingly, the tactile force sense presentation member 11 is pulled, and the tactile force sense specified by the presentation data b is presented to the fingertip of the user 70.

The time management unit 16 manages vibration duration of the vibration generation unit 13, and outputs data (hereinafter referred to as "timer management data") e that specifies the duration to the control unit 14. The control unit 14, upon receiving the timer management data e, causes the vibration generation unit 13 to generate a vibration during the duration specified by the timer management data e, at the time when the movement of the tactile force sense presentation member 11 is started, or at the time before the movement is started.

For example, if the vibration generation unit 13 is a piezoelectric device, the control unit 14 generates a signal for driving the piezoelectric device, and supplies this as vibration control data g to the piezoelectric device. If the vibration generation unit 13 is constituted by a semicircular vibrator and a small motor, the control unit 14 generates a signal for driving the motor and supplies this as the vibration control data g to the motor.

[Device Operation]

Figure 5:
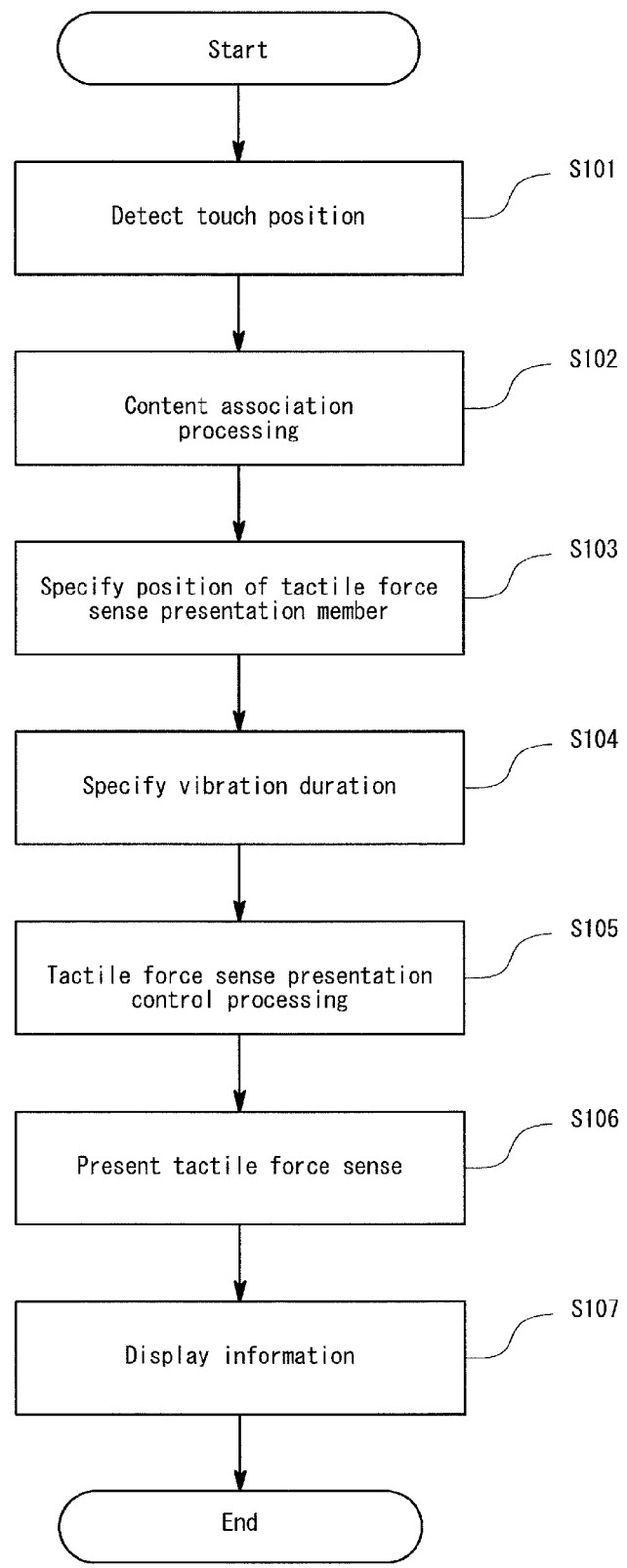
FIG. 5 is a flowchart showing an operation of an information terminal 100 according to Embodiment 1 of the present invention.

Next, operations of the information terminal 100 and the tactile force sense presentation device 10 in Embodiment 1 of the present invention will be described using FIG. 5. FIG. 5 is a flowchart showing an operation of the information terminal 100 according to Embodiment 1 of the present invention. Note that in the following description, FIGS. 1 and 4 will be referred to as appropriate. In Embodiment 1, a tactile force sense presentation method is implemented by operating the tactile force sense presentation device 10. Accordingly, the following description of the operation of the tactile force sense presentation device 10 will take the place of the description of the tactile force sense presentation method according to the present embodiment.

Initially, the user 70 (see FIG. 1) visually checks content that is displayed on the display panel 20 and can be seen through the tactile force sense presentation member 11, and touches the touch sensor 30 in order to operate an object within the virtual space provided by the content. Thus, as shown in FIG. 5, the touch sensor 30 detects the touch position of the user's finger, and outputs the touch detection data a that specifies the detected touch position to the information processing unit 40 (step S101).

Next, the information processing unit 40, upon receiving the touch detection data a output in step S101, references the content data 41, and executes processing (content association processing) for transforming the object in accordance with the touch position (step S102).

Furthermore, in step S102, the information processing unit 40 generates content display information that reflects the content of the content association processing, and outputs this display information as the display data f to the display panel 20. Furthermore, in step S102, the information processing unit 40 calculates a force generated on the object in the virtual space, and outputs the presentation data b that specifies the calculated force to the control unit 14. Note that the details of step S102 will be described later using FIG. 6.

Next, the control unit 14 receives the position detection data c from the position detection sensor 31, and specifies the position of the tactile force sense presentation member 11 detected by the position detection sensor 31 (step S103). Furthermore, the control unit 14 receives the timer management data e from the time management unit 16, and specifies the duration of vibration generation by the vibration generation unit 13 (step S104). Note that the order of steps S103 and S104 may be the same, or may be reversed.

Next, the control unit 14 executes processing (tactile force sense presentation control processing) for presenting a tactile force sense, based on the presentation data b output in step S102, the position of the tactile force sense presentation member 11 specified in step S103, and the duration specified in step S104 (step S105).

Specifically, in step S105, in order to generate a target tactile force sense on the tactile force sense presentation member 11 based on the presentation data b and the position of the tactile force sense presentation member 11, the control unit 14 calculates the amount of control of the four actuators 12, generates the force sense control data d, and outputs it to the actuators 12. Furthermore, in order to generate a vibration on the tactile force sense presentation member 11 during the specified duration, the control unit 14 generates the vibration control data g and outputs it to the vibration generation unit 13. Note that the details of step S105 will be described later using FIG. 7.

Upon step S105 being executed, the tactile force sense presentation device 10 presents the vibration and the tactile force sense caused by the movement of the tactile force sense presentation member 11, to the fingertip of the user 70 (step S106). The content after the content association processing is displayed based on the display data e that is output by the information processing unit 40 in step S102, on the display screen 20*a* of the display panel 20 (step S107). Note that steps S106 and S107 may be executed simultaneously.

In Embodiment 1, steps S101 to S107 are repeatedly executed. Accordingly, if the user 70 performs a drag operation from a point to another point, steps S101 to S107 are repeatedly executed from the start until the end of the dragging, while the user 70 can continuously receive presentation of the vibration and the tactile force sense.

Now, steps S101, S102, and S105 shown in FIG. 5 will be described in more detail using FIGS. 6 to 9.

[Steps S101 and S102]

Figure 6:
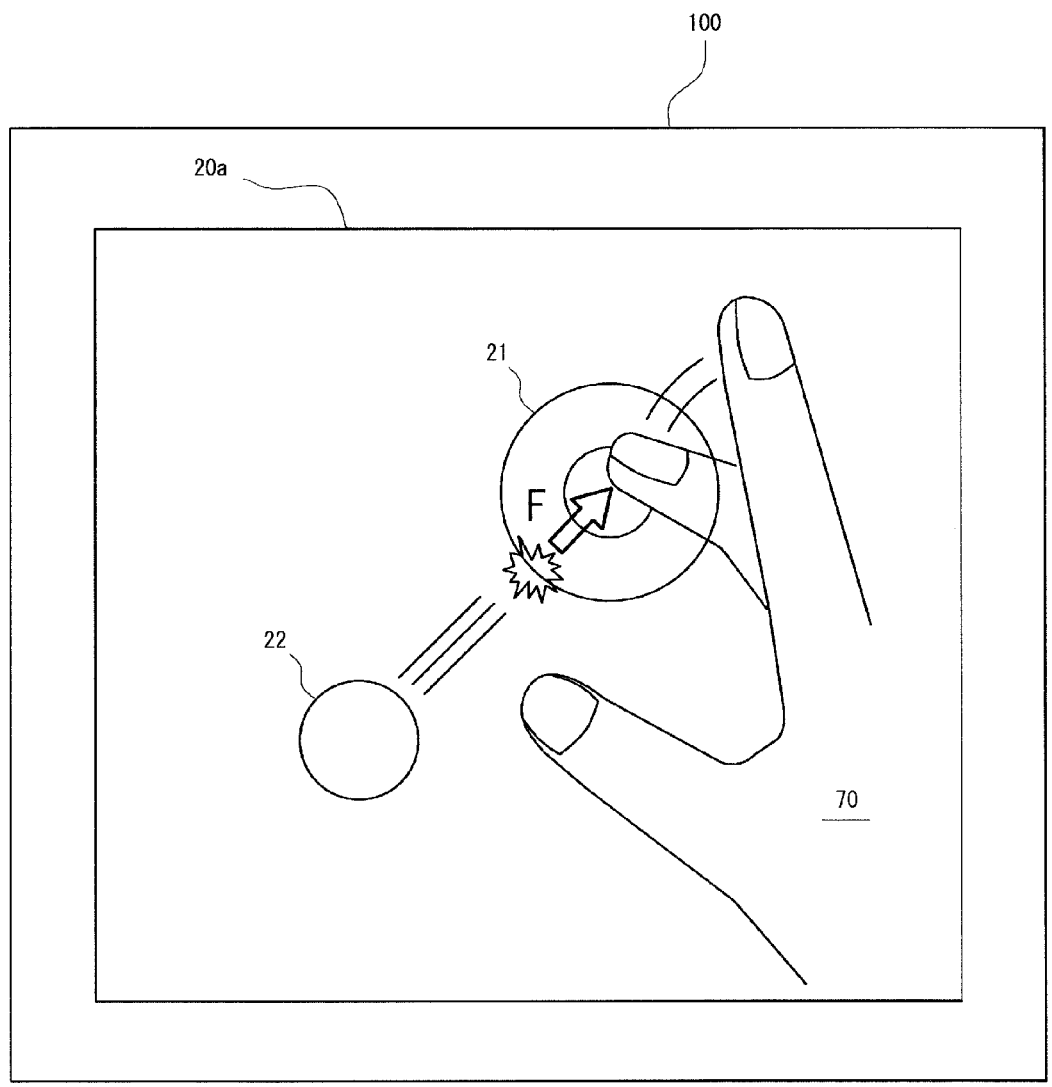
FIG. 6 is a diagram showing exemplary content used in Embodiment 1 of the present invention.

First, steps S101 and S102 will be described in detail using FIG. 6. FIG. 6 is a diagram showing exemplary content used in Embodiment 1 of the present invention. In the example in FIG. 6, the content is an air hockey game, and the user 70 operates a virtual mallet 21 existing in the virtual space by touching of the fingertip, and hits a virtual puck 22.

Initially, upon the user 70 touching the touch sensor 30, the touch sensor 30 executes step S101, and outputs the touch detection data a that specifies the touch position of the finger of the user 70 to the information processing unit 40.

Then, in step S102, the information processing unit 40 executes the content association processing and associates the movement of the finger, which is an operation in the real space, with the movement of the virtual mallet 21 and the virtual puck 22 in the virtual space.

Specifically, the information processing unit 40 moves the virtual mallet 21 so as to follow the finger movement given by the touching of the user 70, such that the virtual objects in the virtual space interacts with a body (finger of the user 70) in the real space. At this time, the information processing unit 40 executes physical simulation in the virtual space, and simulates a change of the positions of the virtual mallet 21 and the virtual puck 22 and a contact force at the time when they come into contact with each other due to the touching of the user 70.

The information processing unit 40 also moves the virtual mallet 30 to the detected touch position upon receiving the touch detection data a. At this time, if the virtual mallet 30 is discontinuously moved to the touch position, the virtual objects overlap each other in some cases. In this case, accurate simulation is difficult.

For this reason, the information processing unit 40 moves the virtual mallet 21 while executing PD (Proportional-Differential) control for applying, to the virtual mallet 21, a force that is in proportion to the distance from the virtual mallet 21 to the touch position and the speed of the virtual mallet 21. If the virtual mallet 21 and the virtual puck 22 come into contact with each other, the information processing unit 40 calculates reaction forces generated on the virtual mallet 21 and the virtual puck 22 due to the contact therebetween, in accordance with physical coefficients of the virtual mallet 21 and the virtual puck 22 in the virtual space. Note that the physical coefficients may include the weight, speed, acceleration, contact direction, a restitution coefficient, and the like of the virtual mallet 21 and the virtual puck 22.

Of the calculated reaction forces, the reaction force received by the virtual mallet 21 from the virtual puck corresponds to the tactile force sense to be presented to the user 70 by the tactile force sense presentation member 11 (see FIG. 6 and FIG. 8, which will be described later). Accordingly, assuming that the reaction force received by the virtual mallet 21 from the virtual puck is a "presentation force F", the information processing unit 40 outputs the presentation data b that specifies the presentation force F to the control unit 14 such that the presentation force F is presented by the tactile force sense presentation member 11. Furthermore, the information processing unit 40 outputs data for displaying the movement of the virtual mallet 21 and the virtual puck 22 as the display data f, which is display information, to the display panel 20.

Step S105

Figure 7:
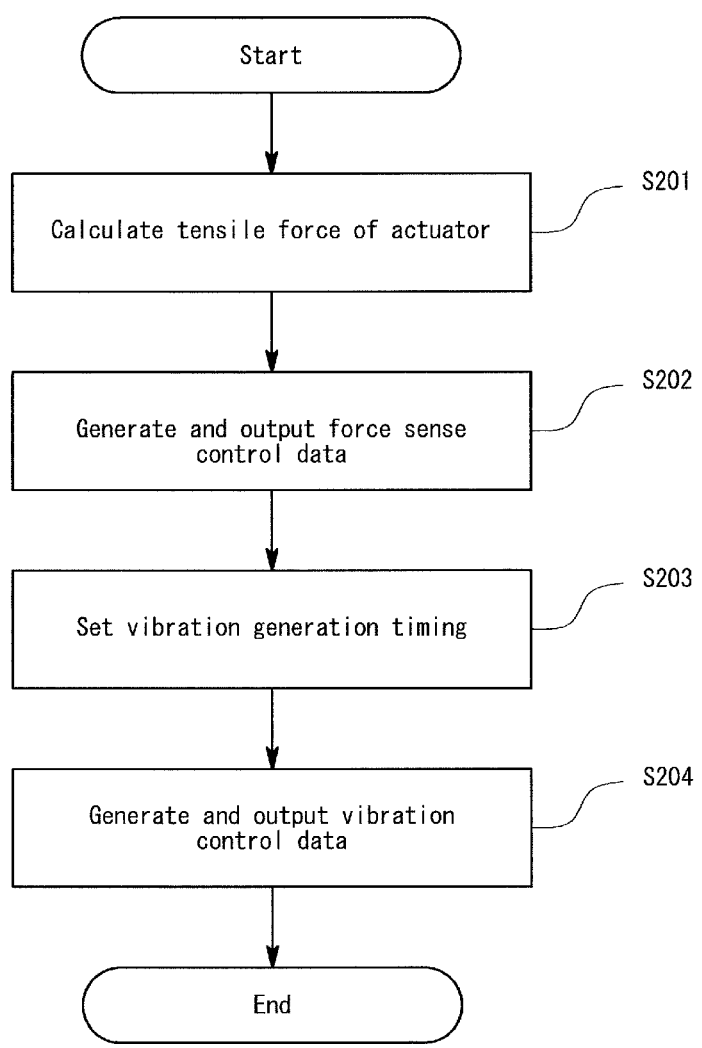
FIG. 7 is a flowchart specifically showing step S105 shown in FIG. 5.

Next, tactile force sense presentation control processing performed in step S105 will be described in detail using FIGS. 7 and 8. FIG. 7 is a flowchart specifically showing step S105 shown in FIG. 5. FIG. 8 is a diagram illustrating processing for calculating tensile forces of the actuators.

As shown in FIG. 7, in step S105, the control unit 14 initially calculates, using the presentation data b and the position detection data c, a tensile force of each actuator 12 (wire 12a), in order to move the tactile force sense presentation member 11 along a horizontal plane (step S201).

Here, processing for calculating tensile forces $\tau_1$, $\tau_2$, $\tau_3$ and $\tau_4$, which are tensile forces of the respective actuators 12, will be described using FIG. 8. In FIG. 8, the position of the tactile force sense presentation member 11 is represented by (x, y), and the coordinate origin (0, 0) is set at the center of a rectangle S. Furthermore, it is assumed in the tactile force sense presentation member 11 in FIG. 8 that an end of the wire 12a of each actuator 12 is connected to the corresponding corner.

Figure 8:
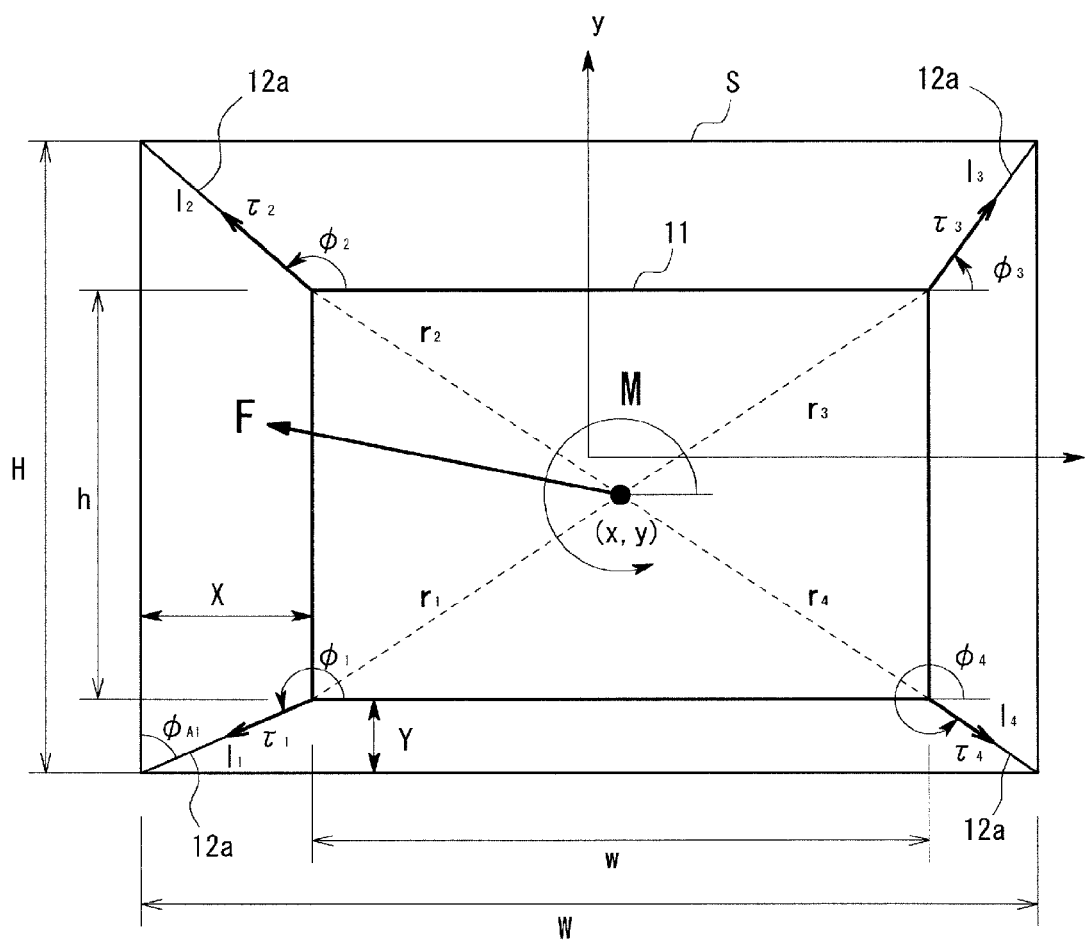
FIG. 8 is a diagram illustrating processing for calculating tensile forces of the actuators.

In FIG. 8, the rectangle S is set such that the distance from a corner of the tactile force sense presentation member 11 to the corresponding corner of the rectangle S corresponds to the length ($l_1$ to $l_4$) of the corresponding wire 12a. Furthermore, in FIG. 8, reference character H denotes the vertical length of the rectangle S, and reference character W denotes the horizontal length of the rectangle S. Reference character h denotes the vertical length of the tactile force sense presentation member 11, and reference character w denotes the horizontal length of the tactile force sense presentation member 11.

In step S201, initially, upon the position detection data b being output from the position detection sensor 31, the control unit 14 specifies the position (x, y) of the tactile force sense presentation member 11, and calculates the angle ($\phi_1$ to $\phi_4$) of each actuator to be used in calculation of the tensile force, based on the position (x, y) and the known lengths (H, W, h, w).

Specifically, in FIG. 8, assuming that the angle formed by the wire 12a having a length $l_1$ and the short side of the rectangle S is $\phi_{A1}$, Equations 1 to 3 below hold under the law of cosines.

$$\cos\phi_{A1} = \frac{(H-h)^2 + l_1^2 - l_2^2}{2(H-h)l_1} \quad \text{[Equation 1]}$$

$$\phi_{A1} = \cos^{-1}\left\{\frac{(H-h)^2 + l_1^2 - l_2^2}{2(H-h)l_1}\right\} \quad \text{[Equation 2]}$$

$$\phi_1 = 180 + (90 - \phi_{A1}) \quad \text{[Equation 3]}$$

Furthermore, the relationships indicated by Equations 4 to 6 below hold among $\phi_{A1}$, the coordinates (x, y), and the length $l_1$ of the actuator.

$$(x, y) = \left(l_1\sin\phi_{A1} + \frac{w}{2} - \frac{W}{2},\; l_1\cos\phi_{A1} + \frac{h}{2} - \frac{H}{2}\right) \quad \text{[Equation 4]}$$

$$\frac{W-w}{2} + y = l_1\cos\phi_{A1} \quad \text{[Equation 5]}$$

$$\frac{H-h}{2} - x = l_1\sin\phi_{A1} \quad \text{[Equation 6]}$$

Accordingly, the control unit 14 calculates $\phi_1$ by applying the coordinates (x, y) and the known values to Equations 1 to 6. $\phi_2$ to $\phi_4$ are also calculated by the same processes.

Subsequently, the control unit 14 calculates the tensile forces $\tau_1$ to $\tau_4$ to be output by the respective actuators 12, using the presentation data b output in step S102, the coordinates (x, y) acquired in step S103, and the calculated $\phi_1$ to $\phi_4$.

Here, it is assumed in FIG. 8 that positions of four vertexes of the tactile force sense presentation member 11 are represented by position vectors based on the center of gravity of the tactile force sense presentation member 11 serving as a reference, that is, $r_1$, $r_2$, $r_3$, and $r_4$. If the tactile force sense presentation member 11 is a quadrangle, the respective directions of the position vectors $r_1$, $r_2$, $r_3$, and $r_4$ are determined by the vertical length h and the horizontal length w of the tactile force sense presentation member 11. Since the distances from the center of gravity to the respective vertexes are the same, the quantities of the position vectors are the same. Furthermore, in FIG. 8, reference character M denotes the moment that rotates the tactile force sense presentation member 11 around the center of gravity thereof, and the moment M is generated in accordance with the balance between tensile forces $\tau_1$ to $\tau_4$.

Specifically, in Embodiment 1, the control unit 14 calculates the tensile forces $\tau_1$ to $\tau_4$ such that conditions (a) to (d) below are satisfied.

(a) The resultant force of the tensile forces $\tau_1$ to $\tau_4$ coincides with the force generated on the object (virtual mallet 21: see FIG. 6) in the virtual space, that is, the presentation force F calculated in step S102.

(b) The moment M generated on the tactile force sense presentation member 11 by the tensile forces $\tau_1$ to $\tau_4$ coincides with the moment generated on the object in the virtual space.

(c) Each of the tensile forces $\tau_1$ to $\tau_4$ is larger than or equal to the minimum tensile force $\tau_{min}$ with which the corresponding wire 12a does not loosen, and the minimum tensile force $\tau_{min}$ is larger than 0 (zero).

(d) The sum of the tensile forces $\tau_1$ to $\tau_4$ is the minimum value within the range where the conditions (a) to (c) are satisfied.

Incidentally, in Embodiment 1, the number of degrees of freedom in the conditions for constraining the tactile force sense presentation member 11 is three, but the tensile force that can be output by each actuator 12 has four degrees of freedom, which is redundant. For this reason, the tensile forces $\tau_1$ to $\tau_4$ need to be optimized using an optimizing calculation method, and the above condition (d) is set. The following is a detailed description of the conditions (a) to (d).

The condition (a) can be represented by Equation 7 below. As indicated by Equation 7, the resultant force of the tensile forces $\tau_1$ to $\tau_4$ is the sum of the inner products of the respective tensile forces and the angle of the corresponding actuators 12. Accordingly, the sum of the inner products needs to coincide with the target presentation force F.

$$\sum_{i=1}^{4} \tau_i \Phi_i = F \qquad \text{[Equation 7]}$$

The moment M in the condition (b) is set to 0 (zero) in Embodiment 1. Accordingly, the condition (b) can be represented by Equation 8 below. As indicated in Equation 8, the moment M is the sum of the outer products of the respective position vectors $r_1$ to $r_4$ and components of the respective tensile forces in directions extending from the respective corners of the tactile force sense presentation member 11 toward the centers of gravity. This sum of the outer products needs to be 0 (zero). Note that if it is desired to generate set moment on the tactile force sense presentation member 11, Equation 8 obtained by substituting an arbitrary value for the value of M may be used.

$$\sum_{i=1}^{4} r_i \times \tau_i \Phi_i = M = 0 \qquad \text{[Equation 8]}$$

The condition (c) is set in order to prevent the tactile force sense presentation member 11 from becoming unable to move parallel with an xy plane as a result of any of the actuators 12 loosening. Furthermore, if a tensile force is too large, the corresponding wire may possibly be cut off, and accordingly the condition (c) sets the maximum value of the tensile force. The condition (c) can be represented by Equation 9 below.

$$0 < \tau_{min} \leq \tau_i \qquad \text{[Equation 9]}$$

The condition (d) is set in order to optimize the tensile forces $\tau_1$ to $\tau_4$ as described above, that is, to minimize energy consumption by the actuators 12. If the condition (d) is not set, the tensile forces $\tau_1$ to $\tau_4$ may possibly become wastefully large.

The condition (d) can be represented by Equation 10 below. The function shown in Equation 10 aims for minimizing the sum of the tensile forces of the actuators 12 while increasing the efficiency thereof. Reference character J denotes a target function value that is set in order to perform optimization. The tensile forces $\tau_1$, $\tau_2$, $\tau_3$, and $\tau_4$ are calculated such that J is minimized. Linear programming, which is one of the optimizing calculation methods, is executed by using the function shown in Equation 10.

$$\min: J = \sum_{i=1}^{4} \tau_i \qquad \text{[Equation 10]}$$

As a result of calculating the tensile forces $\tau_1$ to $\tau_4$ such that the above-described conditions (a) to (d) are satisfied, the tensile forces have optimum values for presenting the target presentation force F. The target presentation force F is generated by the resultant force of the tensile forces $\tau_1$, $\tau_2$, $\tau_3$, and $\tau_4$ of the four actuators 12.

Next, the control unit 14 calculates, for each respective actuators 12, electric power to be supplied by the corresponding electric heating devices 12b such that the tensile forces calculated in step S201 are exerted on the actuators 12. The control unit 14 then creates the force sense control data d that enables the calculated electric power to be supplied, and outputs it to the electric heating devices 12b of the actuators 12 (step S202).

Next, the control unit 14 sets vibration generation timing (step S203). Thereafter, the control unit 14 generates the vibration control data d based on the duration specified in step S104, and outputs the vibration control data d to the vibration generation unit 13 at the timing that is set in step S203 (step S204).

Figure 9:
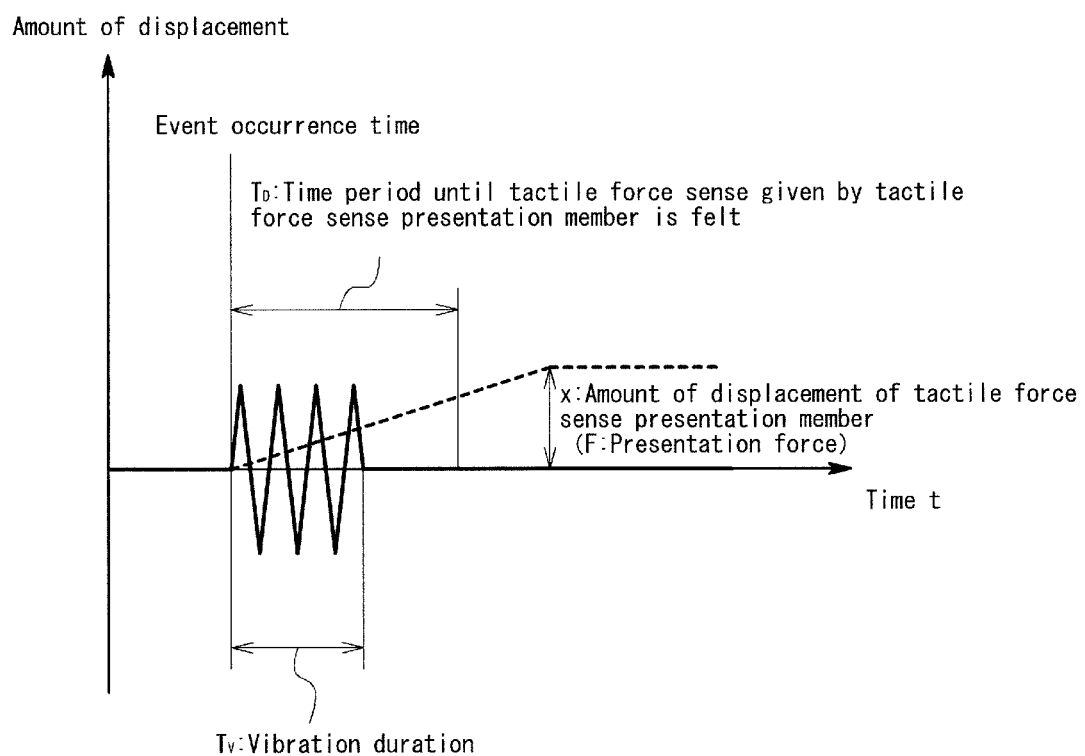
FIG. 9 is a diagram showing a relationship between vibration generation timing and the amount of displacement of a tactile force sense presentation member.

Steps S203 and S204 will now be described using FIG. 9. FIG. 9 is a diagram showing a relationship between vibration generation timing and the amount of displacement of the tactile force sense presentation member. In FIG. 9, the horizontal axis indicates elapsed time t, and the vertical axis indicates the amount of displacement of the tactile force sense presentation member 11. Also, in FIG. 9, the amount of displacement includes both the amount of a movement of the tactile force sense presentation member 11 along a horizontal plane caused by tension of the actuators 12, and the amount of a movement thereof caused by a vibration generated by the vibration generation unit 13. Furthermore, in FIG. 9, the former amount of displacement is indicated by a broken line, and the latter amount of displacement is indicated by a solid line.

It is assumed, as shown in FIG. 9, that the movement of the tactile force sense presentation member 11 caused by the actuators 12 is started simultaneously with occurrence of an event that requires tactile force sense presentation on the content. At this time, since the displacement speed of the actuators 12 is low because of the structure thereof, a time lag occurs after the tactile force sense presentation member 11 actually starts to be moved by the actuator 12 until the user 70 notices the tactile force sense presentation. TD denotes the time period of this time lag.

On the other hand, the response speed of the vibration generation unit 13 is high, and the time period after the control unit 14 gives an instruction to generate a vibration until the vibration is actually generated is very short. Accordingly, a vibration is generated on the tactile force sense presentation member 11 substantially simultaneously with the start of the movement of the tactile force sense presentation member 11. For this reason, the user 70 can notice that the tactile force sense is presented, immediately after the occurrence of the event that requires tactile force sense presentation.

Accordingly, upon steps S203 and S204 being executed, even if a time lag occurs in tactile force sense presentation using the movement, the user 70 can feel the vibration during this time period. Consequently, the user is restrained from feeling a time delay in tactile force sense presentation.

[Program]

A program according to Embodiment 1 need only be a program that causes a computer to execute steps S103 to S106 that are shown in FIG. 5. The tactile force sense presentation device 10 and the tactile force sense presentation method according to Embodiment 1 can be realized by installing this program on a computer and executing it. In this case, a CPU (Central Processing Unit) of the computer functions as the control unit 14 and performs processing.

The computer that can realize the tactile force sense presentation device 10 is not particularly limited, and may be the aforementioned microcomputer, or may be a general-purpose personal computer. Furthermore, the computer that can realize the tactile force sense presentation device 10 may be a computer provided in a mobile phone, a smartphone, or a tablet-type information terminal.

The program according to Embodiment 1 may be provided in a state of being stored in a computer-readable recording medium, or may be transmitted via the Internet. Note that a general-purpose semiconductor storage device such as CF (Compact Flash (registered trademark)) or SD (Secure Digital), a magnetic storage medium such as a flexible disk, or an optical storage medium such as CD-ROM (Compact Disk Read Only Memory) is given as a specific example of the recording medium.

Effect of Embodiment 1

As described above, according to Embodiment 1, it is possible to present, to a user, combination of a tactile force sense caused by a movement of the tactile force sense presentation member 11 and a vibration at a high transmission speed. It is accordingly possible to make it difficult for the user to feel a time delay in tactile force sense presentation. Furthermore, as a result, the following effects can be achieved.

Firstly, a small actuator can be used, which contributes to a reduction in the size, thickness, and weight of the information terminal 100.

Secondly, since a tactile force sense and a vibration can be presented, variations of expression in tactile force sense presentation can be increased by combining a tactile force sense and a vibration.

Thirdly, even if actuators with a low displacement speed are used, it is possible to make it difficult for the user to feel a time delay in tactile force sense presentation. Accordingly, an increase in variations of available actuators can be achieved.

Embodiment 2

Figure 10:
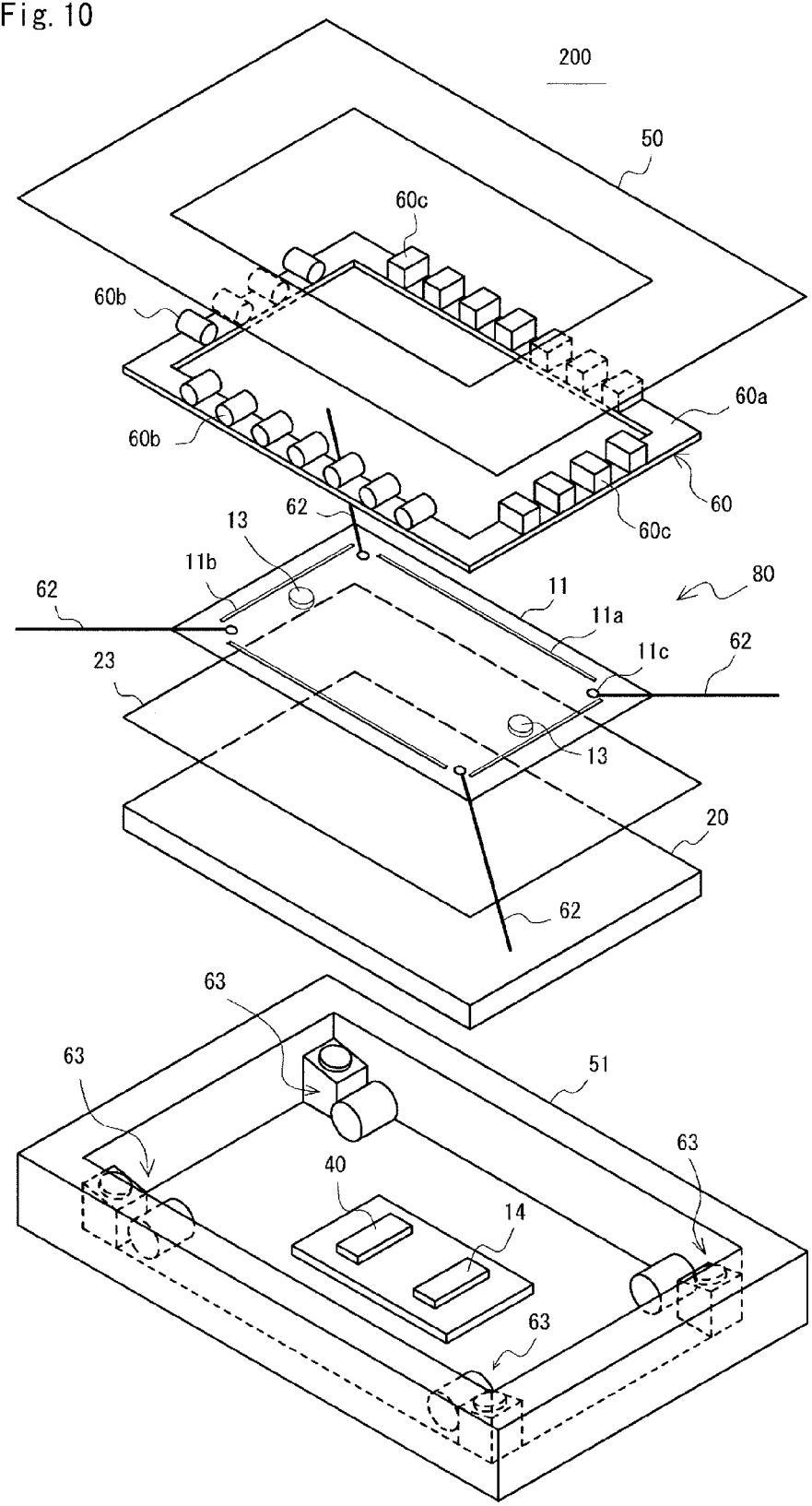
FIG. 10 is an exploded perspective view showing constituent components of an information terminal according to Embodiment 2 of the present invention.
Figure 11A:
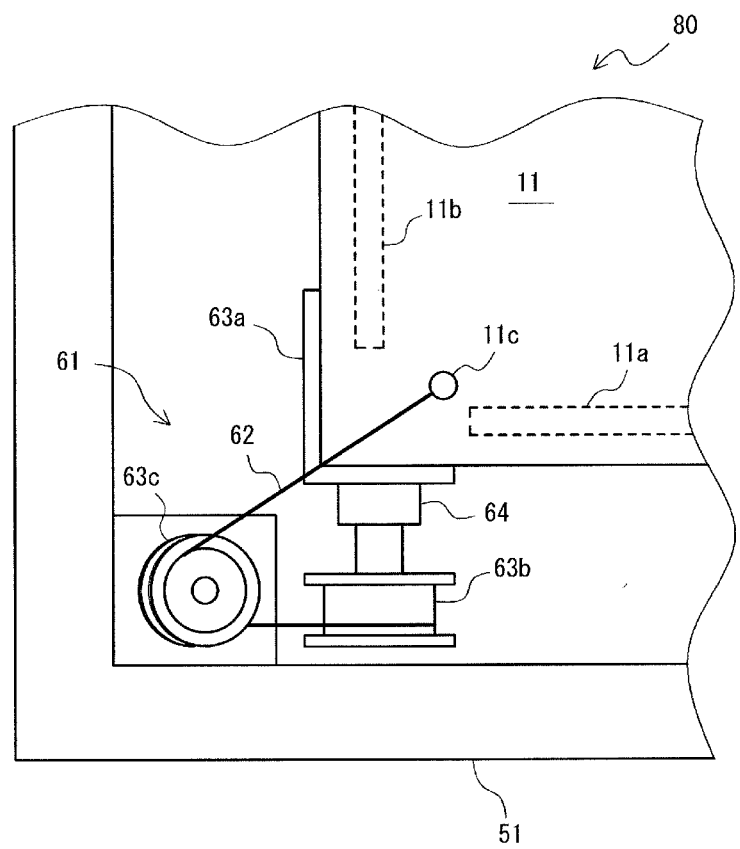
FIGS. 11A and 11B are diagrams showing a specific configuration of an actuator shown in FIG. 10.
Figure 11B:
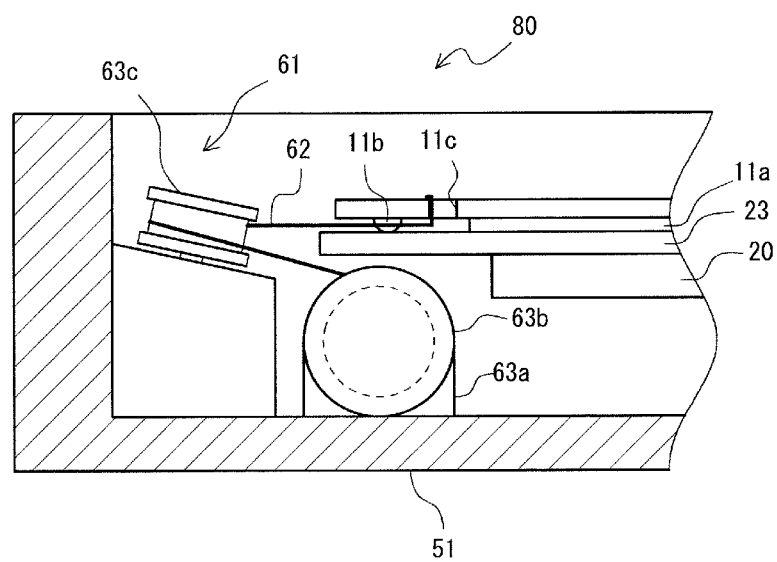

Next, a tactile force sense presentation device, an information terminal, a tactile force sense presentation method, and a program according to Embodiment 2 of the present invention will be described with reference to FIGS. 10 and 11. FIG. 10 is an exploded perspective view showing constituent components of the information terminal according to Embodiment 2 of the present invention. FIGS. 11A and 11B are diagrams showing a specific configuration of an actuator shown in FIG. 10. FIG. 11A is a plan view, and FIG. 11B is a side view.

As shown in FIG. 10, an information terminal 200 and a tactile force sense presentation device 80 in Embodiment 2 are different from the information terminal 100 and the tactile force sense presentation device 10 in Embodiment 1 shown in FIGS. 1 and 2, in the configuration of the touch sensor and the actuators. The following description is mainly about the difference from Embodiment 1.

In Embodiment 2, as shown in FIG. 10, a touch sensor 60 is provided with a frame 60a, a plurality of light-emitting devices 60b arranged on one side of each two facing sides in parallel, and a plurality of light-receiving devices 60c arranged on the other sides in parallel, unlike the touch panel used in Embodiment 1.

Furthermore, a part of the light-emitting devices 60b are arranged so as to be able to radiate light in a vertical direction of the screen, and the remaining light-emitting devices 60b are arranged so as to be able to radiate light in a horizontal direction of the screen. For this reason, upon a part of radiated light being interrupted by a finger of the user 70 that moves on the face of the tactile force sense presentation member 11, the part where the light is interrupted is detected as the touch position. The touch sensor 60 also outputs the touch detection data a that specifies the detected touch position to the information processing unit 40.

As shown in FIGS. 10, 11A, and 11B, in Embodiment 2, each actuator 61 is provided with a wire 62 and a wire tensile unit 63. One end of each wire 62 is connected to the tactile force sense presentation member 11 via a through hole 11c provided near a corresponding corner of the tactile force sense presentation member 11.

Each wire tensile unit 63 is provided with a motor 63a that functions as an actuator, a pulley 63b for rolling up the corresponding wire 62, and a tensile force direction conversion pulley 63c. With this configuration, rotational forces applied by the motors 63a are transmitted as tensile forces to the tactile force sense presentation member 11 via the wires 62, and consequently the tactile force sense presentation member 11 is pulled, and a tactile force sense is presented to the user 70 (see FIG. 1).

Specifically, first, the rotational forces of the motors 63a are converted, by the pulleys 63b for rolling up the wires 62, into linear tensile forces exerted along side faces of the casing 51. Next, the directions of the tensile forces are converted from the linear directions along the side faces of the casing into directions extending from the through holes 11c of the tactile force sense presentation member 11 toward respective corners of the casing 51, by the tensile force direction conversion pulleys 63c arranged at the four corners of the casing 51. Accordingly, upon each motor 63a being activated, the tactile force sense presentation member 11 is pulled toward the corresponding tensile force direction conversion pulley 63c due to the generated tensile force.

Furthermore, as shown in FIGS. 11A and 11B, a space is provided between the support panel 23 and the tactile force sense presentation member 11 by the projecting portions 11a and 11b formed in the tactile force sense presentation member 11, and each wire 62 is guided toward the wire tensile unit 63 through this space. Furthermore, since the cross-sections of the projecting portions 11a and 11b are semicircular, and the projecting portions 11a and 11b come into linear contact with the support panel 23, the surface of the support panel is prevented from being damaged by a movement of the tactile force sense presentation member 11.

As shown in FIGS. 11A and 11B, each motor 63a is provided with a sensor 64 for detecting the number of rotations of the motor 63a. The sensor 64 outputs data that specifies the detected number of rotations to the control unit 14 (see FIG. 10). Note that specific examples of the sensor 64 include an optical rotary encoder.

If the number of rotations of the motor 63a is found, the length of the wire 62 is also found since the circumferential length of the pulley 63b is already known. Accordingly, assuming that each wire 62 is not loose, if the length of each wire 62 is found, the position of the tactile force sense presentation member 11 can be specified from these lengths. For this reason, in Embodiment 2, the position detection sensor does not need to be provided as in Embodiment 1, and the device configuration can be simplified.

According to Embodiment 2, although the size of the actuators increases, a large force can be applied to the tactile force sense presentation member 11, and Embodiment 2 is accordingly effective in the case where the size of the display panel 20 is large.

Furthermore, if a geared motor in which a gear is contained is used as each motor 63a, a presentation force can be enhanced while reducing the size of the motor. In this case, although the displacement speed of the tactile force sense presentation member 11 decreases, it is difficult for the user to feel a time delay in tactile force sense presentation, due to a vibration generated by the vibration generation unit 13, as in Embodiment 1.

Furthermore, as shown in FIGS. 10, 11A, and 11B, the tensile force direction conversion pulleys 63c serving as starting points of pulling when pulling the wires 62 toward the casing 51 are arranged so as to form a rectangle coinciding with the shape of the casing 51 when the tensile force direction conversion pulleys 63c are connected by lines. However, in Embodiment 2, the positions of the starting points of the pulling are not particularly limited, and the starting points of the pulling may be arranged such that a parallelogram or a trapezoid is formed when these starting points are connected by lines, for example. The starting points of the pulling do not need to be located in the same plane, and the number thereof does not need to be four.

Note that, in Embodiment 2, operations of the information terminal 200 and the tactile force sense presentation device 80 are the same as the operations shown in FIG. 5 in Embodiment 1. In Embodiment 2 as well, a tactile force sense presentation method is implemented by operating the tactile force sense presentation device 80. Furthermore, a program according to Embodiment 2 need only be a program that causes a computer to execute steps conforming to steps S103 to S106 that are shown in FIG. 5.

(Modifications)

Subsequently, various modifications of Embodiments 1 and 2 described above will be described below. First, although the display panel 20 does not move together with the tactile force sense presentation member 11 in Embodiment 1 and Embodiment 2, the display panel 20 may move together with the tactile force sense presentation member 11. Furthermore, the display panel 20 itself may be used, in place of the transparent panel shown in FIG. 2, as the tactile force sense presentation member 11.

However, in this case, the display panel 20 moves with respect to the casing 51 (see FIG. 2), which causes the screen 20a to move together. Accordingly, in order not to cause an image of the content to move in conjunction with the display panel 20 as viewed from the user, it is preferable that the information processing unit 40 executes processing for moving the image of the content in a direction opposite to the moving direction of the display panel 20 when displaying the image.

In Embodiments 1 and 2 described above, four actuators are used in order to move the tactile force sense presentation member 11 along a horizontal plane. However, the number of actuators is not particularly limited. For example, in a case of moving the tactile force sense presentation member in an arbitrary direction in a plane to present a tactile force sense, the number of actuators may be at least three.

Furthermore, if the tactile force sense presentation member is moved in an arbitrary direction on a line to present a tactile force sense, the number of actuators may be two. If the tactile force sense presentation member is moved using the balance with an external force such as the gravity to present a tactile force sense, the number of actuators may be one. In addition, if the tactile force sense presentation member 11 is moved or rotated in an arbitrary direction in a plane and in a three-dimensional space to present a tactile force sense, the number of actuators may be four or more.

In Embodiments 1 and 2 described above, the tactile force sense presentation member 11 moves only along a horizontal plane (front face of the display panel 20). However, in the present invention, the moving direction of the tactile force sense presentation member 11 is not limited thereto. The direction of a movement of the tactile force sense presentation member 11 caused by the actuators may be a direction vertical to a horizontal plane, or the like. Furthermore, in the present invention, the shape of the tactile force sense presentation member 11 is not limited to a panel shape. In terms of these aspects, the tactile force sense presentation device may have a configuration (e.g., a configuration with a glove-like shape) in which a tactile force sense is fed back to each joint of a finger of the user. Furthermore, the tactile force sense presentation device may be formed by a tactile force sense presentation member having the shape of a pen.

The actuators are not limited to those used in Embodiments 1 and 2 described above. For example, the actuators may have a configuration in which a link mechanism is provided. Furthermore, the actuators may have a function of discharging gas, and in this case, a tactile force sense will be presented also by discharging gas.

In Embodiments 1 and 2 described above, an example is described in which a tactile force sense is presented if an object moves in the virtual space in conjunction with a movement of a finger of the user (see FIG. 6). However, the present invention is not limited thereto. Embodiments 1 and 2 are also applicable to the case where an object undergoes a change other than a movement, e.g., the case where the shape, color, size, or the like of an object changes. The tactile force sense to be presented may be different depending on the object subjected to a user operation.

Furthermore, in Embodiments 1 and 2 described above, the information processing unit 40 for performing processing for displaying content is housed together with the display panel, the touch sensor, and the tactile force sense presentation device in the same casing. However, the present invention is not limited thereto. The information processing unit 40 may be realized by a computer such as an external personal computer. In this case, the control unit 14 may also be realized by the computer that realizes the information processing unit.

Application Example

Subsequently, various application examples of Embodiment 1 and Embodiment 2 described above will now be described.

The tactile force sense presentation device according to Embodiments 1 and 2 are applicable to navigation for movement. For example, when navigating a walking user's way to a destination, the tactile force sense presentation device can present, by means of a tactile force sense, the direction in which the user is to proceed, to a touching finger of the user. In this case, the direction of the navigation is the information to be presented as content.

The tactile force sense presentation device according to Embodiments 1 and 2 can provide a more substantial feeling of operation to the user by presenting a tactile force sense in conjunction with a movement of a scrolled screen. For example, regarding screen scrolling, a display method is known with which, if a screen cannot be scrolled since no more information is contained, a user is notified that scrolling is impossible, by causing the display screen to bound in a scrolling direction. In the case of employing this display method, if a tactile force sense is presented in conjunction with the bound of the display screen, the user can receive information more substantially, quickly, and accurately.

In the case where the displayed content is a web site, the tactile force sense presentation device according to Embodiments 1 and 2 can notify the user that a Link button or the like is provided under the touching finger, by means of a tactile force sense. In this case, the user can receive information that is difficult to obtain only with displayed information. Furthermore, if a harmful site is contained in a linked content, the tactile force sense presentation device can issue a warning by presenting a tactile force sense so as to make it difficult for the user to press the Link button.

The tactile force sense presentation device according to Embodiments 1 and 2 can be used for presenting a tactile force sense not only in conjunction with a virtual object (virtual body), but also for giving moving reaction to an input operation of master-slave robot arms or the like. For example, in the case where a user operates a real body by remotely operating robot arms while viewing a screen, the tactile force sense presentation device can present a tactile force sense as reaction to contact with an obstacle, a warning before contacting with an obstacle, or the like. In this case, the user can operate the robot arms more safely and accurately.

The tactile force sense presentation device according to Embodiments 1 and 2 can be used to understand a state of a tactile map or the like. In other words, the tactile force sense presentation device can be used by the visually handicapped to understand a map. Furthermore, when a general user understands walls and routes in a three-dimensional maze or the like, if a tactile force sense corresponding to the walls and routes is presented by the tactile force sense presentation device, it is easy for the user to understand the shape and state.

The tactile force sense presentation device according to Embodiments 1 and 2 can be used to present information of the stroke order of Chinese characters in character learning. For a child to understand the stroke order of characters in learning of Chinese characters, the tactile force sense presentation device can present a resistance force as a tactile force sense in response to input in an incorrect input direction, when the stroke order, tobi, hane (an upward turn in a Chinese character), or the like is incorrect. The tactile force sense presentation device is useful in assistance of character learning.

The tactile force sense presentation device according to Embodiments 1 and 2 can present a tactile force sense that is moved in a direction parallel with the display panel, as feedback of a touch of clicking during a device operation. Since feedback using a tactile force sense is important in input key operations, the tactile force sense presentation device can change the feedback such that a user can easily understand the feedback. Furthermore, in the case where input by the user changes, the tactile force sense presentation device can notify the user of the change in input, by providing feedback with a touch that is different from a usual touch of clicking.

An input method called flicking is known as a method for inputting a character on a touch panel. With flicking, an input character is determined by the position touched by a finger and the direction in which a finger slides. If the tactile force sense presentation device according to Embodiments 1 and 2 is applied to this flicking, a tactile force sense can be presented such that the finger can easily slide only in the sliding direction, and resistance is generated against a finger movement in a direction in which selection cannot be made by sliding. In this case, the user can be prevented from making an incorrect movement when selecting a character, and input of a character is facilitated.

The tactile force sense presentation device according to Embodiments 1 and 2 can be used as a feedback device in a simulation of playing of a music instrument such as the piano, a simulation of a surgical operation, or a simulation of clay molding. That is to say, the tactile force sense presentation device can present a tactile force sense as device feedback to input, such that the tactile force sense serves as part of entertainment or pre-learning of use of a device.

The tactile force sense presentation device according to Embodiments 1 and 2 can be used to recognize a state of a product when purchasing the product at a place other than a real shop, such as at a web site or on a television. Unlike purchase of a product at a real shop, a problem arises regarding the actual touch of the product when the product is purchased on a web site or on a television. For this reason, with the tactile force sense presentation device, the user can obtain information about the actual touch of the product, and can make a purchase after understanding the product more.

The tactile force sense presentation device according to Embodiments 1 and 2 can be used in entertainment, such as in understanding of an optical illusion picture. In this case, the tactile force sense presentation device presents a sense of incongruity to a user by giving the user a tactile force sense that does not coincide with visual information as presented information. For example, Maurits Cornelis Escher's optical illusion picture in which spiral stairs extend cannot be actually touched, but a touch of a body in a virtual space can be presented with the tactile force sense presentation device, and accordingly, the user can touch the optical illusion picture.

Examples

Figure 12A:
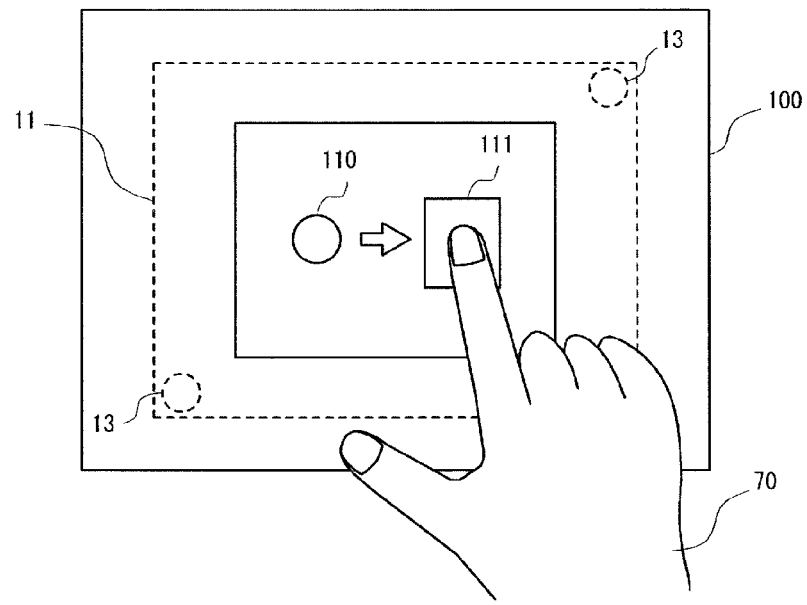
FIG. 12A is a plan view.

An information terminal having a configuration similar to the information terminal 200 described in Embodiment 2 was created, and evaluation was made using this information terminal on whether a force sense can be presented to a user so as not to make the user feel a temporal delay in the presentation. FIG. 12 shows the information terminal in an example. FIG. 12A is a plan view, and FIG. 12B is a partial cross-sectional view.

Figure 12B:
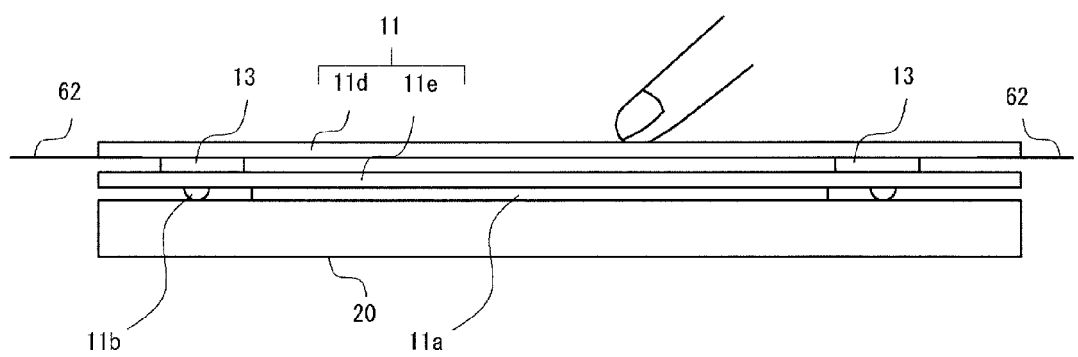
FIG. 12B is a partial cross-sectional view.

As shown in FIG. 12B, in the present example, the tactile force sense presentation member 11 is constituted by two transparent panels 11d and 11e. Piezoelectric devices are used as the vibration generation unit 13. Two piezoelectric devices are sandwiched between the panel 11d and the panel 11e.

In the present example, the actuators used for moving the tactile force sense presentation member 11 are each constituted by the wire 62 and the wire tensile unit (not shown in FIG. 12), as in the example shown in FIGS. 10, 11A, and 11B in Embodiment 2. The tactile force sense presentation member 11 moves along a horizontal plane by being pulled by the wire 62 using a motor, and presents a tactile force sense.

In the present example, it is assumed that, when a user is touching a virtual cube 111 arranged in a virtual space, the cube 111 collides with a virtual ball 110, and a tactile force sense corresponding to the collision is presented to a finger of the user 70.

(Verification 1)

First, a time delay was intentionally generated until a tactile force sense is presented by the actuators, and at this time, the way users feel the time delay with and without a vibration was verified.

Figure 13:
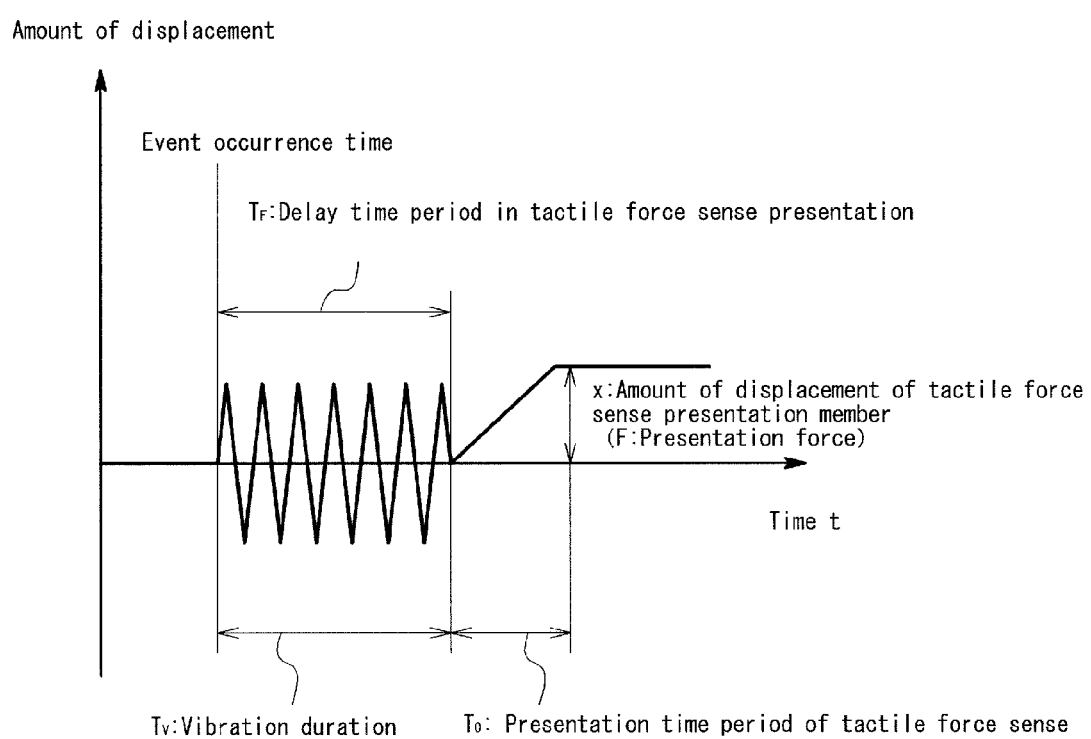
FIG. 13 is a diagram showing a relationship between vibration duration and the amount of displacement of a tactile force sense presentation member in Verification 1 in the example.

FIG. 13 is a diagram showing a relationship between vibration duration and the amount of displacement of the tactile force sense presentation member in Verification 1 in the example. As shown in FIG. 13, in Verification 1 in the present example, when a tactile force sense needs to be generated, vibration generation is first executed, and thereafter a movement of the tactile force sense presentation member caused by the actuators is started. In Verification 1, a time delay is intentionally generated until a tactile force sense is presented by the actuators, and the user is asked to evaluate the time delay at this time.

In FIG. 13, $T_F$ denotes a delay time period (presentation delay time period) in tactile force sense presentation by the actuators, $T_V$ denotes vibration duration, and To denotes a time period of presentation of a tactile force sense by the actuators. In Verification 1, $T_F=T_V$. Furthermore, it is assumed that the movement of the tactile force sense presentation member caused by the actuators is started simultaneously with the end of vibration generation, while the displacement speed of the actuators is high and the user does not feel a time delay depending on tactile force sense presentation by the actuators.

Five users were asked to evaluate five cases where the presentation delay time period $T_F$ is 0.0 [s], 0.25 [s], 0.5 [s], 0.75 [s], and 1.00 [s], using evaluation values on a scale of five from "not feel a delay" to "feel a delay". The result is shown in FIG. 14.

Figure 14:
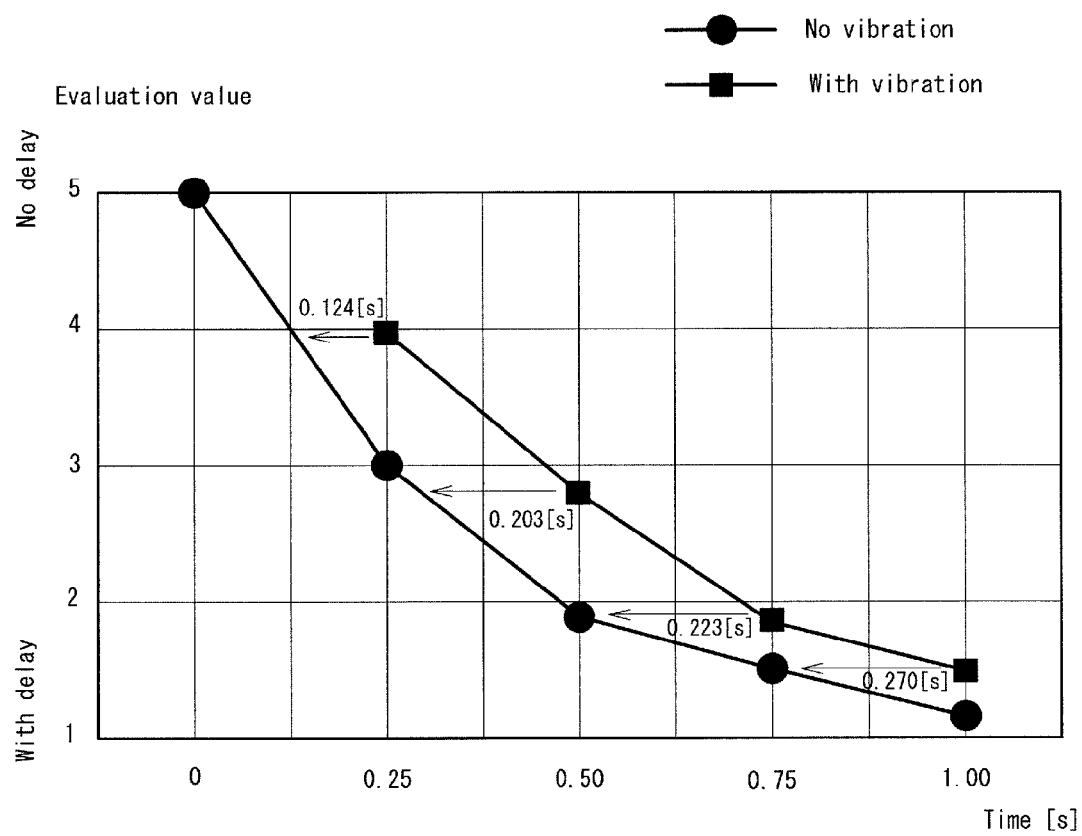
FIG. 14 is a diagram showing a result of user evaluation in Verification 1 in the example.

FIG. 14 is a diagram showing a result of user evaluation in Verification 1 in the example. In FIG. 14, the horizontal axis indicates the delay time period $T_F$ in tactile force sense presentation by the actuators, and the vertical axis indicates the evaluation value. As shown in FIG. 14, in Verification 1, the users evaluated both a case (■ in FIG. 14) where presentation using a vibration was performed before the tactile force sense presentation by the actuators, and a case (● in FIG. 14) where presentation using a vibration was not performed. Note that each evaluation value on the vertical axis is an average value of the evaluation values of the five users.

As shown in FIG. 14, it can be found that in the case (■ in FIG. 14) where presentation using a vibration was performed before the tactile force sense presentation by the actuators, more users felt that a significant delay did not occur, resulting in a higher evaluation value, than in the case (● in FIG. 14) where presentation using a vibration was not performed. Specifically, it was possible to make it difficult for the users to feel a time delay in tactile force sense presentation for about 0.2 [s] by performing presentation using a vibration, as compared with the case where presentation using a vibration was not performed.

(Verification 2)

Next, the relationship between the length of the vibration duration and the way users feel a time delay was verified.

Figure 15A:
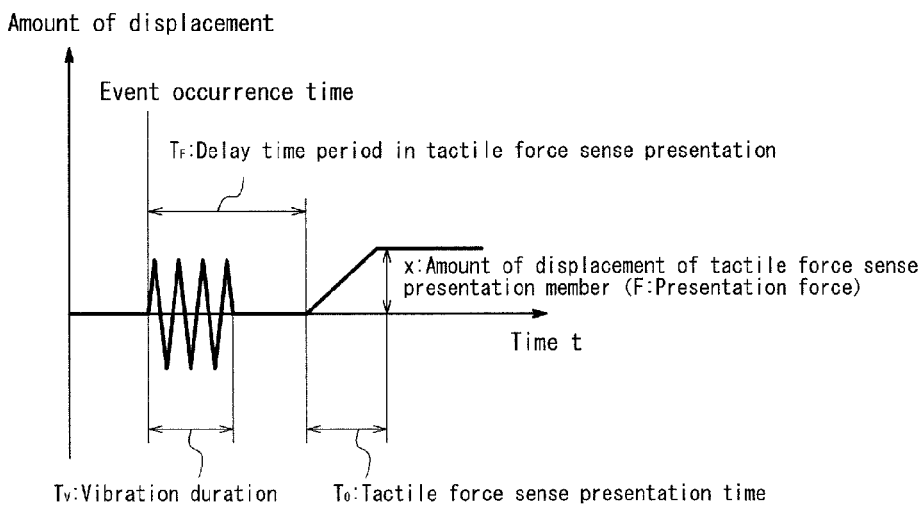
FIGS. 15A to 15C are diagrams each showing a relationship between vibration duration and the amount of displacement of a tactile force sense presentation member in Verification 2 in the example, with different lengths of the vibration duration.
Figure 15B:
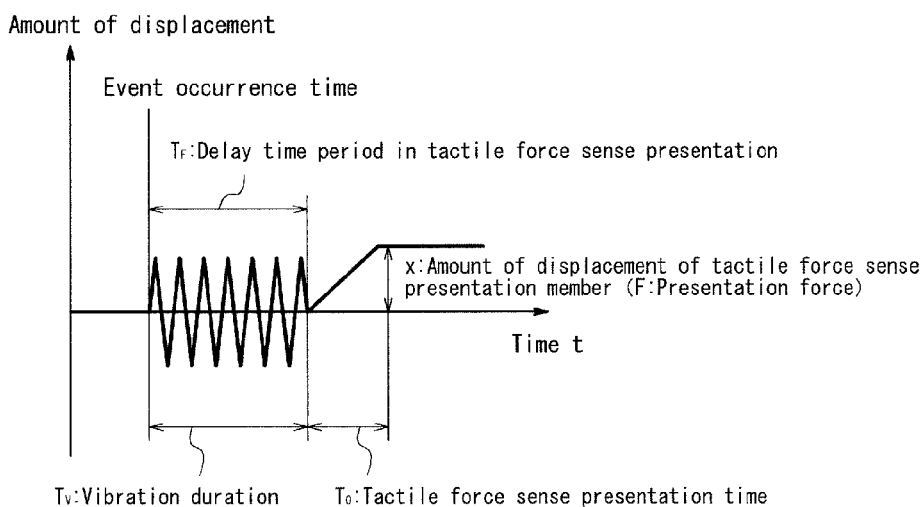
Figure 15C:
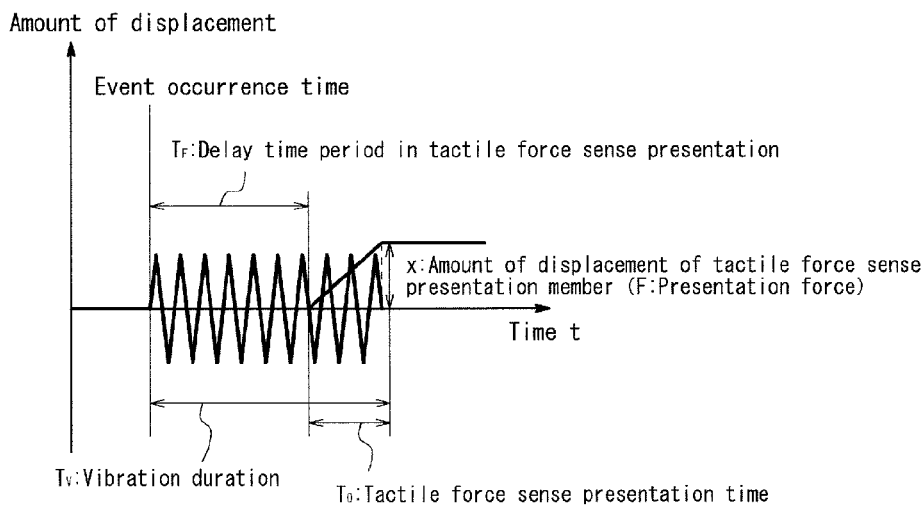

FIGS. 15A to 15C show the relationship between the vibration duration and the amount of displacement of the tactile force sense presentation member in Verification 2 in the example, with different lengths of the vibration duration. As shown in FIGS. 15A to 15C, in Verification 2 in the present example as well, when a tactile force sense needs to be generated, vibration generation is first executed, and thereafter a movement of the tactile force sense presentation member caused by the actuators is started, as in Verification 1. In Verification 2, three patters shown in FIGS. 15A to 15C are verified.

In FIGS. 15A to 15C, $T_F$ denotes a delay time period (presentation delay time period) in tactile force sense presentation by the actuators, $T_V$ denotes vibration duration, and To denotes a time period of tactile force sense presentation by the actuators. FIG. 15A shows a pattern (interval: $T_F>T_V$) in which vibration presentation is ended before tactile force sense presentation by the actuators is started, and a temporal "interval" is given. FIG. 15B shows a pattern (simultaneous: $T_F=T_V$) in which the start time of tactile force sense presentation by the actuators is set "simultaneously" with the end time of a vibration. FIG. 15C shows a pattern (overlap: $T_F<T_V$) in which continuation of a vibration "overlaps" tactile force sense presentation by the actuators.

Five users were asked to evaluate, regarding the patterns shown in FIGS. 15A to 15C, five cases where the presentation delay time period $T_F$ is 0.0 [s], 0.25 [s], 0.5 [s], 0.75 [s], and 1.00 [s], using evaluation values on a scale of five from "not feel a delay" to "feel a delay. The result is shown in FIG. 16.

Figure 16:
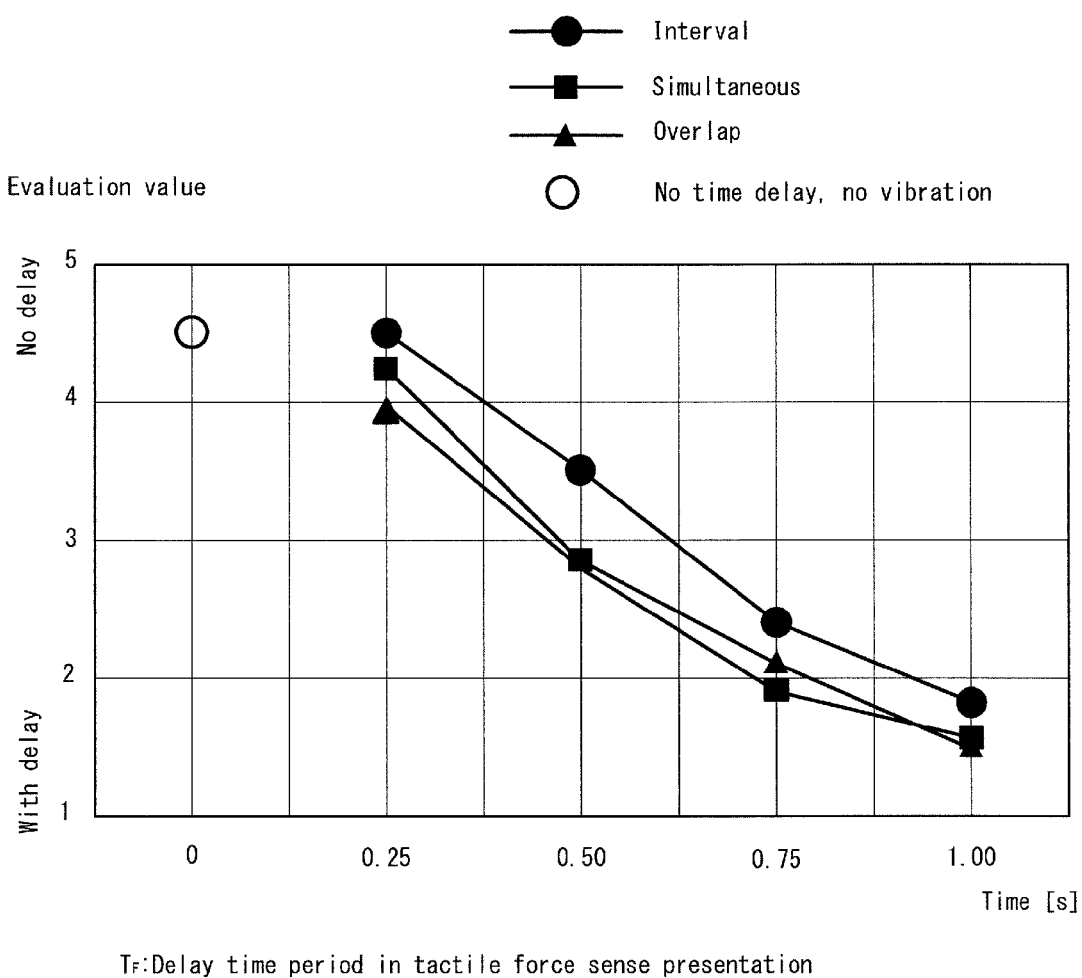
FIG. 16 is a diagram showing a result of user evaluation in Verification 2 in the example.

FIG. 16 is a diagram showing a result of user evaluation in Verification 2 in the example. In FIG. 16 as well, the horizontal axis indicates the delay time period $T_F$ in tactile force sense presentation by the actuators, and the vertical axis indicates the evaluation value. FIG. 16 shows user evaluation on each of the aforementioned three patterns. In FIG. 16, "●" indicates the pattern (interval) shown in FIG. 15A, "■" indicates the pattern (simultaneous) shown in FIG. 15B, and "▲" indicates the pattern (overlap) shown in FIG. 15C.

As shown in FIG. 16, the number of users who feel that a significant time delay in force sense presentation does not occur is largest in the pattern (interval) shown in FIG. 15A, is second largest in the pattern (simultaneous) shown in FIG. 15B, and is smallest in the pattern (overlap) shown in FIG. 15C. That is to say, FIG. 16 indicates that it is difficult for the user to feel a significant time delay in force sense presentation in the case where vibration presentation is ended before tactile force sense presentation (force sense presentation) by the actuators is started, as compared with the other cases.

It was confirmed from the above two verification results that it is difficult for the user to feel a time delay in tactile force sense presentation if tactile force sense presentation using a vibration is performed in addition to tactile force sense presentation by the actuators. That is to say, the effectiveness of performing tactile force sense presentation using a vibration was proved by the example.

According to the above two verification results, it is preferable that tactile force sense presentation by the actuators and tactile force sense presentation using a vibration are started as early as possible after an event that requires tactile force sense presentation occurs. Although the actuators having a high displacement speed are used in the present example since a time delay in force sense presentation is intentionally generated, the present invention is not limited thereto. Actuators having a low displacement speed can be used in the present invention, and in this case, it is preferable that tactile force sense presentation using a vibration is performed as early as possible.

The above-described embodiments and the example can be represented in full or in part by Notes 1 to 19 described below, but are not limited to the following description.

(Note 1)

A tactile force sense presentation device for presenting a tactile force sense to a user who performs an input operation on a screen of a display panel, the tactile force sense presentation device including:

a tactile force sense presentation member for transmitting a tactile force sense to the user;

an actuator that moves the tactile force sense presentation member in order to present the tactile force sense;

a vibration generation unit that generates a vibration on the tactile force sense presentation member; and a control unit that controls the actuator and the vibration generation unit, wherein, when content on the screen of the display panel is changed in accordance with the input operation of the user on the screen, the control unit gives the actuator an instruction to move the tactile force sense presentation member such that the tactile force sense corresponding to the change of the content is presented, and gives the vibration generation unit an instruction to generate a vibration such that a vibration is generated on the tactile force sense presentation member simultaneously with start of the movement of the tactile force sense presentation member, or before the start of the movement.

(Note 2)

The tactile force sense presentation device according to Note 1, wherein the tactile force sense presentation member is optically transparent, has a panel shape, and is arranged on a front face side of the display panel, and the actuator moves the tactile force sense presentation member along a front face of the display panel.

(Note 3)

The tactile force sense presentation device according to Note 1 or 2, wherein the control unit gives the vibration generation unit an instruction to generate a vibration until the movement of the tactile force sense presentation member is completed.

(Note 4)

The tactile force sense presentation device according to any of Notes 1 to 3, further including a time management unit that manages vibration duration of the vibration generation unit, and outputs data that specifies the duration to the control unit, wherein the control unit causes the vibration generation unit to generate a vibration during the duration specified by the output data.

(Note 5)

The tactile force sense presentation device according to any of Notes 1 to 4, wherein the actuator is formed by a plurality of wire-shaped actuators, and the wire-shaped actuators are each connected, at an end thereof, to the tactile force sense presentation member, and moves the tactile force sense presentation member using a tensile force of each of the actuators.

(Note 6)

The tactile force sense presentation device according to any of Notes 1 to 5, wherein the actuator is provided with a plurality of wires for holding the tactile force sense presentation member, and a wire tensile unit that is provided for each of the wires and that pulls the corresponding wire.

(Note 7)

An information terminal including:

a display panel that displays content on a screen;

a touch sensor that detects a position touched by a user on the screen;

an information processing unit that accepts an input operation in accordance with the position detected by the touch sensor, and changes the content in accordance with the accepted input operation; and a tactile force sense presentation device capable of presenting a tactile force sense to the user, the tactile force sense presentation device including:

a tactile force sense presentation member for transmitting a tactile force sense to the user;

an actuator that moves the tactile force sense presentation member in order to present the tactile force sense;

a vibration generation unit that generates a vibration on the tactile force sense presentation member; and a control unit that controls the actuator and the vibration generation unit, wherein, when the content on the screen of the display panel is changed by the information processing unit in accordance with the input operation of the user on the screen, the control unit gives the actuator an instruction to move the tactile force sense presentation member such that the tactile force sense corresponding to the change of the content is presented, and gives the vibration generation unit an instruction to generate a vibration such that a vibration is generated on the tactile force sense presentation member simultaneously with start of the movement of the tactile force sense presentation member, or before the start of the movement.

(Note 8)

The information terminal according to Note 7, wherein the tactile force sense presentation member is optically transparent, has a panel shape, and is arranged on a front face side of the display panel, the touch sensor is a touch panel arranged on a front face side of the tactile force sense presentation member, and the actuator moves the tactile force sense presentation member with the touch sensor along a front face of the display panel.

(Note 9)

The information terminal according to Note 7, wherein the touch sensor is a touch panel arranged on a front face side of the display panel, and the touch panel functions as the tactile force sense presentation member, or the touch panel and the display panel integrally function as the tactile force sense presentation member.

(Note 10)

The information terminal according to any of Notes 7 to 9, wherein the control unit gives the vibration generation unit an instruction to generate a vibration until the movement of the tactile force sense presentation member is completed.

(Note 11)

The information terminal according to any of Notes 7 to 10, further including a time management unit that manages vibration duration of the vibration generation unit, and outputs data that specifies the duration to the control unit, wherein the control unit causes the vibration generation unit to generate a vibration during the duration specified by the output data.

(Note 12)

The information terminal according to any of Notes 7 to 11, wherein the actuator is formed by a plurality of wire-shaped actuators, and the wire-shaped actuators are each connected, at an end thereof, to the tactile force sense presentation member and move the tactile force sense presentation member by means of expansion or contraction of the actuators.

(Note 13)

The information terminal according to any of Notes 7 to 12, wherein the actuator is provided with a plurality of wires for holding the tactile force sense presentation member, and a wire tensile unit that is provided for each of the wires and that pulls the corresponding wire.

(Note 14)

A method for presenting a tactile force sense to a user who performs an input operation on a screen of a display panel, using a device including a tactile force sense presentation member for transmitting a tactile force sense to the user, an actuator that moves the tactile force sense presentation member in order to present the tactile force sense, and a vibration generation unit that generates a vibration on the tactile force sense presentation member, the method including:

a step (a) of giving, when content on the screen of the display panel is changed in accordance with an input operation of the user on the screen, the actuator an instruction to move the tactile force sense presentation member such that the tactile force sense corresponding to the change of the content is presented; and a step (b) of giving the vibration generation unit an instruction to generate a vibration such that a vibration is generated on the tactile force sense presentation member simultaneously with start of the movement of the tactile force sense presentation member, or before the start of the movement.

(Note 15)

The tactile force sense presentation method according to Note 14, wherein, in the step (b), an instruction to generate a vibration is given to the vibration generation unit until the movement of the tactile force sense presentation member is completed.

(Note 16)

The tactile force sense presentation method according to Note 14 or 15, further including a step (c) of managing vibration duration of the vibration generation unit, and outputting data that specifies the duration to the control unit, wherein, in the step (b), the vibration generation unit is caused to generate a vibration during the duration specified by the data that is output in the step (c).

(Note 17)

A computer-readable recording medium storing a program for a device including a tactile force sense presentation member for transmitting a tactile force sense to a user who performs an input operation on a screen of a display panel, an actuator that moves the tactile force sense presentation member in order to present the tactile force sense, a vibration generation unit that generates a vibration on the tactile force sense presentation member, and a computer, the program including a command for causing the computer to execute:

a step (a) of giving, when content on the screen of the display panel is changed in accordance with an input operation of the user on the screen, the actuator an instruction to move the tactile force sense presentation member such that the tactile force sense corresponding to the change of the content is presented; and a step (b) of giving the vibration generation unit an instruction to generate a vibration such that a vibration is generated on the tactile force sense presentation member simultaneously with start of the movement of the tactile force sense presentation member, or before the start of the movement.

(Note 18)

The computer-readable recording medium according to Note 17, wherein, in the step (b), an instruction to generate a vibration is given to the vibration generation unit until the movement of the tactile force sense presentation member is completed.

(Note 19)

The computer-readable recording medium according to Note 17 or 18, wherein the program further includes a command for causing the computer to execute a step (c) of managing vibration duration of the vibration generation unit, and outputting data that specifies the duration to the control unit, and in the step (b), the vibration generation unit is caused to generate a vibration during the duration specified by the data that is output in the step (c).

Although the claimed invention has been described above with reference to the embodiments, the claimed invention is not limited to the above embodiments. Various modifications that will be appreciated by those skilled in the art can be made to the configurations and details of the claimed invention, within the scope of the claimed invention.

This application claims the benefit of priority based on Japanese Patent Application No. 2012-192507 filed on Aug. 31, 2012, the entire contents of which are incorporated herein by reference.

INDUSTRIAL APPLICABILITY

According to the present invention, in tactile force sense presentation, it is possible to make it difficult for a user to feel a time delay in tactile force sense presentation, without being affected by performance of an actuator. The present invention is useful in various fields in which tactile force sense presentation is required, such as computer interfaces, various kinds of simulation, games, and the like.

DESCRIPTIONS OF REFERENCE NUMERALS

10 Tactile force sense presentation device (Embodiment 1)
11 Tactile force sense presentation member
11a, 11b Projecting portion
11c Through hole
11d, 11e Panel
12 Actuator
12a Wire made of shape memory alloy
12b Electric heating device
13 Vibration generation unit
14 Control unit
15 Pulley
16 Time management unit
20 Display panel
21 Virtual mallet
22 Virtual puck
23 Support panel
30 Touch sensor (touch panel)
40 Information processing unit
41 Content data
50 Cover
51 Casing
60 Touch sensor
60a Frame
60b Light-emitting device
60c Light-receiving device
61 Actuator
62 Wire
63 Wire tensile unit
63a Motor
63b Pulley for rolling up wire
63c Tensile force direction conversion pulley
64 Sensor
70 User
80 Tactile force sense presentation device (Embodiment 2)
100 Information terminal (Embodiment 1)
110 Virtual ball
111 Virtual cube
200 Information terminal (Embodiment 2)
a Touch detection data
b Presentation data
c Position detection data
d Force sense control data
e Timer management data
f Display data
g Vibration control data

The invention claimed is:

1. A tactile force sense presentation device for presenting a tactile force sense to a user who performs an input operation on a screen of a display panel, the tactile force sense presentation device comprising:
   a tactile force sense presentation member for transmitting a tactile force sense to the user;
   an actuator that moves the tactile force sense presentation member in order to present the tactile force sense;
   a vibration generation unit that generates a vibration on the tactile force sense presentation member;
   a control unit that controls the actuator and the vibration generation unit; and
   a time management unit that manages vibration duration of the vibration generation unit, and outputs data that specifies the duration to the control unit,
   wherein, when content on the screen of the display panel is changed in accordance with the input operation of the user on the screen, the control unit gives the actuator an instruction to move the tactile force sense presentation member such that the tactile force sense corresponding to the change of the content is presented, and gives the vibration generation unit an instruction to generate a vibration such that a vibration is generated on the tactile force sense presentation member simultaneously with start of the movement of the tactile force sense presentation member, or before the start of the movement,
   wherein the control unit causes the vibration generation unit to generate a vibration during the duration specified by the output data,
   wherein the duration specified by the output data is until the movement of the tactile force sense presentation member is completed.

2. The tactile force sense presentation device according to claim 1,
   wherein the tactile force sense presentation member is optically transparent, has a panel shape, and is arranged on a front face side of the display panel, and
   the actuator moves the tactile force sense presentation member along a front face of the display panel.

3. The tactile force sense presentation device according to claim 1,
   wherein the actuator is formed by a plurality of wire-shaped actuators, and
   the wire-shaped actuators are each connected, at an end thereof, to the tactile force sense presentation member, and moves the tactile force sense presentation member using a tensile force of each of the actuators.

4. The tactile force sense presentation device according to claim 1,
   wherein the actuator is provided with a plurality of wires for holding the tactile force sense presentation member, and a wire tensile unit that is provided for each of the wires and that pulls the corresponding wire.

5. A method for presenting a tactile force sense to a user who performs an input operation on a screen of a display panel,
   using a device including a tactile force sense presentation member for transmitting a tactile force sense to the user, an actuator that moves the tactile force sense presentation member in order to present the tactile force sense, and a vibration generation unit that generates a vibration on the tactile force sense presentation member,
   the method comprising:
   a step (a) of giving, when content on the screen of the display panel is changed in accordance with an input operation of the user on the screen, the actuator an instruction to move the tactile force sense presentation member such that the tactile force sense corresponding to the change of the content is presented; and
   a step (b) of giving the vibration generation unit an instruction to generate a vibration such that a vibration is generated on the tactile force sense presentation member simultaneously with start of the movement of the tactile force sense presentation member, or before the start of the movement, further including a step (c) of managing vibration duration of the vibration generation unit, and outputting data that specifies the duration to the control unit, wherein, in the step (b), the vibration generation unit is caused to generate a vibration during the duration specified by the data that is output in step (c), wherein the duration specified by the data that is output in the step (c) is until the movement of the tactile force sense presentation member is completed.

6. A non-transitory computer-readable recording medium storing a program for a device including a tactile force sense presentation member for transmitting a tactile force sense to a user who performs an input operation on a screen of a display panel, an actuator that moves the tactile force sense presentation member in order to present the tactile force sense, a vibration generation unit that generates a vibration on the tactile force sense presentation member, and a computer, the program including a command for causing the computer to execute:

a step (a) of giving, when content on the screen of the display panel is changed in accordance with an input operation of the user on the screen, the actuator an instruction to move the tactile force sense presentation member such that the tactile force sense corresponding to the change of the content is presented; and a step (b) of giving the vibration generation unit an instruction to generate a vibration such that a vibration is generated on the tactile force sense presentation member simultaneously with start of the movement of the tactile force sense presentation member, or before the start of the movement, wherein the program further includes a command for causing the computer to execute a step (c) of managing vibration duration of the vibration generation unit, and outputting data that specifies the duration to the control unit, and in the step (b), the vibration generation unit is caused to generate a vibration during the duration specified by the data that is output in step (c), wherein the duration specified by the data that is output in the step (c) is until the movement of the tactile force sense presentation member is completed.

* * * * *